US011963921B2

(12) United States Patent
Harden et al.

(10) Patent No.: US 11,963,921 B2
(45) Date of Patent: Apr. 23, 2024

(54) CONVERTIBLE WALKER

(71) Applicants: Leo Harden, Auburn, AL (US); Jerrell Harden, Banks, AL (US); Russell Harden, Banks, AL (US); Floyd Hicks, Ramah, AL (US)

(72) Inventors: Leo Harden, Auburn, AL (US); Jerrell Harden, Banks, AL (US); Russell Harden, Banks, AL (US); Floyd Hicks, Ramah, AL (US)

( * ) Notice: Subject to any disclaimer, the term of this patent is extended or adjusted under 35 U.S.C. 154(b) by 0 days.

(21) Appl. No.: 18/192,474

(22) Filed: Mar. 29, 2023

(65) Prior Publication Data

US 2024/0009062 A1 Jan. 11, 2024

Related U.S. Application Data

(63) Continuation-in-part of application No. 17/860,894, filed on Jul. 8, 2022, now Pat. No. 11,633,322.

(51) Int. Cl.
*A61H 3/00* (2006.01)
*A61H 3/04* (2006.01)

(52) U.S. Cl.
CPC ............... *A61H 3/008* (2013.01); *A61H 3/04* (2013.01); *A61H 2003/007* (2013.01); *A61H 2003/046* (2013.01)

(58) Field of Classification Search
CPC .... A61H 3/008; A61H 3/03; A61H 2003/007; A61H 2003/046
See application file for complete search history.

(56) References Cited

U.S. PATENT DOCUMENTS

| | | | |
|---|---|---|---|
| 1,307,058 | A | 6/1919 | McGrath |
| 4,076,304 | A | 2/1978 | Deucher |
| 4,119,164 | A | 10/1978 | Fogg et al. |
| 4,162,101 | A | 7/1979 | McCague et al. |
| 4,362,311 | A | 12/1982 | Bergman |
| 4,506,930 | A | 3/1985 | Lambert |
| 4,555,121 | A | 11/1985 | Lockard et al. |
| 4,598,944 | A | 7/1986 | Meyer et al. |
| 4,623,194 | A | 11/1986 | Pillot |
| 4,807,870 | A | 2/1989 | Hickman |
| 5,137,102 | A | 8/1992 | Houston et al. |
| 5,224,721 | A | 7/1993 | Santmann |
| 5,265,689 | A | 11/1993 | Kauffmann |

(Continued)

FOREIGN PATENT DOCUMENTS

| | | | |
|---|---|---|---|
| CN | 200977236 | Y | 11/2007 |
| CN | 201814751 | U | 5/2011 |

(Continued)

*Primary Examiner* — Steve Clemmons
(74) *Attorney, Agent, or Firm* — Sterne, Kessler, Goldstein & Fox P.L.L.C.

(57) ABSTRACT

A convertible walker is provided. The convertible walker can have a wheelchair configuration and a walker configuration to allow a user to alternately sit and stand, and can include a frame supporting an upper rest and a lower rest. A fall seat can be provided that is coupled to the lower rest and rotatable relative to the upper rest. The fall seat can break the fall of a user by rotating via the falling action of the user. In both the wheelchair and walker configurations, a torso support can retain the user in the convertible walker.

22 Claims, 19 Drawing Sheets

(56) References Cited

U.S. PATENT DOCUMENTS

| | | | | | |
|---|---|---|---|---|---|
| 5,320,122 | A * | 6/1994 | Jacobson, II | A61H 3/04 297/DIG. 10 |
| 5,364,120 | A | 11/1994 | Shimansky | |
| 5,366,036 | A | 11/1994 | Perry | |
| 5,419,571 | A | 5/1995 | Vaughan | |
| 5,451,193 | A | 9/1995 | Pickard | |
| 5,476,432 | A * | 12/1995 | Dickens | A61H 3/04 482/67 |
| 5,558,358 | A | 9/1996 | Johnson | |
| 6,231,067 | B1 | 5/2001 | Johnson et al. | |
| 6,338,493 | B1 | 1/2002 | Wohlgemuth et al. | |
| 6,343,802 | B1 * | 2/2002 | Workman | A61H 3/008 482/68 |
| 6,371,142 | B1 | 4/2002 | Battiston | |
| 6,431,572 | B1 | 8/2002 | Harden | |
| 6,547,112 | B2 | 4/2003 | Gallagher | |
| 6,619,681 | B2 | 9/2003 | Gutierrez | |
| 7,040,637 | B2 | 5/2006 | Owens et al. | |
| 7,100,716 | B2 | 9/2006 | Engels et al. | |
| 7,669,863 | B2 | 3/2010 | Steiner et al. | |
| 7,673,888 | B2 | 3/2010 | Lauren et al. | |
| 7,815,209 | B2 | 10/2010 | Porcheron | |
| 8,104,835 | B2 | 1/2012 | Ovre et al. | |
| 8,584,689 | B2 | 11/2013 | Catton | |
| 9,565,947 | B2 | 2/2017 | Oblak et al. | |
| 9,655,806 | B2 | 5/2017 | Naucke | |
| 9,662,264 | B2 | 5/2017 | Jacobs | |
| 9,962,303 | B1 | 5/2018 | Wilson et al. | |
| 10,080,699 | B2 | 9/2018 | Schraudolph et al. | |
| 10,292,893 | B2 | 5/2019 | Vanausdall | |
| 11,033,451 | B2 * | 6/2021 | Schreier | A61H 3/04 |
| 11,285,059 | B1 | 3/2022 | Alexander | |
| 11,471,361 | B2 | 10/2022 | Bardgett et al. | |
| 11,622,908 | B2 * | 4/2023 | VanAusdall | A61H 3/04 280/647 |
| 2007/0283990 | A1 | 12/2007 | Fernandez et al. | |
| 2011/0006494 | A1 | 1/2011 | Walker | |
| 2013/0168931 | A1 | 7/2013 | Baraitaru | |
| 2013/0207354 | A1 | 8/2013 | Gardner | |
| 2014/0084559 | A1 * | 3/2014 | Fang | A61H 3/04 280/47.38 |
| 2020/0206067 | A1 | 7/2020 | Hanson et al. | |
| 2021/0015690 | A1 | 1/2021 | You | |
| 2021/0228433 | A1 * | 7/2021 | Landry | A61B 5/1117 |

FOREIGN PATENT DOCUMENTS

| | | | | | |
|---|---|---|---|---|---|
| CN | 108969314 | A | | 12/2018 | |
| CN | 110403803 | A | * | 11/2019 | A61H 3/04 |
| CN | 111388218 | A | | 7/2020 | |
| CN | 112704606 | A | | 4/2021 | |
| EP | 1523970 | B1 | | 8/2008 | |
| FR | 2826567 | A1 | * | 1/2003 | A61H 3/04 |
| GB | 1139796 | A | | 1/1969 | |
| GB | 2340388 | B | | 11/2001 | |
| GB | 2519228 | B | | 10/2015 | |
| JP | 6308565 | B2 | | 4/2018 | |
| KR | 20130007100 | A | * | 1/2018 | |
| KR | 101852149 | B1 | | 4/2018 | |
| WO | 9008669 | A1 | | 8/1990 | |
| WO | 2004047707 | A2 | | 6/2004 | |
| WO | 2017199164 | A1 | | 11/2017 | |
| WO | WO-2018086659 | A1 | * | 5/2018 | |

* cited by examiner

CONVERTIBLE WALKER

CROSS-REFERENCE TO RELATED APPLICATION

This application is a continuation-in-part of U.S. application Ser. No. 17/860,894, filed Jul. 8, 2022, which is incorporated herein by reference in its entirety.

BACKGROUND OF THE INVENTION

Field of the Invention

The present invention relates to walkers. In particular, the present invention relates to walkers that are capable of converting to and from wheelchairs. Such walkers may be configured as upright walkers. Additional embodiments include wheelchairs, or other mobility devices.

Background

Assistive devices are essential tools that provide people who require support the ability and independence to conduct their daily lives. These users may be elderly members of society, for example, or those with temporary or permanent physical ailments. Wheelchairs and walkers are assistive devices that provide mobility and can be customized to provide various support aspects to users. For example, wheelchairs can be user-operated such that a user can propel and navigate the wheelchair independently. The user can access brakes to stop the wheelchair, such as to leave the walker/wheelchair or when the user will be stationary for an extended period of time. The user can alternately release the brake to facilitate mobility. Additionally, wheelchairs can provide comfort with cushioning and adjustments to fit different users.

As the aging population grows and technology advances, innovation in assistive devices is a natural and needed development. However, improvements to available walkers/wheelchairs have been limited. Users require advanced mobility that allows them to both sit and stand. A walker is a separate assistive device that provides walking mobility by acting as a frame to support a user. Wheelchairs that are convertible to walkers exist, but can be complicated, as well as difficult to use and ineffective. For example, in walker configurations, the user may be positioned uncomfortably, which may stall mobility. In addition, the design of the wheelchair may impede freedom of movement in the walker configuration. These and other issues can compromise independence. The transition from a wheelchair configuration to a walker configuration can be complex as well, requiring multiple people for conversion. Accordingly, a need exists for advanced assistive devices that provide users with mobility and independent operation.

BRIEF SUMMARY OF THE INVENTION

Some embodiments are directed to a walker having a walker configuration, including a frame configured to surround a user on the rear, left, and right sides. In some embodiments, the walker includes an upper rest supported by the frame and a lower rest supported by the frame and disposed below the upper rest.

In some embodiments, a torso support is attached to and extending from the lower rest, and the torso support is configured to secure around a front of a torso in the wheelchair configuration and the walker configuration. In some embodiments, the torso support includes a first end and a second end opposing the first end, the first end and the second end configured to extend to a front of a torso.

In some embodiments, the frame includes an attachment to secure the torso support when not in use. In some embodiments, the frame includes a front handle. In some embodiments, the attachment is disposed adjacent to the front handle. In some embodiments, the walker further includes a fall seat configured to rotate by the falling action of a user to catch the user. In some embodiments, the walker includes a front handle, wherein the torso support is configured to extend around the waist.

Some embodiments are directed to a walker, including: a frame, an upper rest supported by the frame, a lower rest supported by the frame and disposed below the upper rest, and a fall seat having a first position and a second position, the fall seat configured to rotate from the first position to the second position by the falling action of a user to catch the user. In some embodiments, the fall seat is coupled to the lower rest such that the user is seated on the lower rest when the fall seat is rotated to the second position.

In some embodiments, the fall seat is configured to be foldable. In some embodiments, the lower rest includes the fall seat. In some embodiments, the convertible walker includes a first spring configured to bias the fall seat to be in the first position, and a second spring configured to provide assistance force upward when a user is standing from a seated position. In some embodiments, the fall seat is biased to be in the first position.

In some embodiments, a spring is coupled to the upper rest and the fall seat, the spring configured to bias the fall seat to be in the first position. In some embodiments, the fall seat is configured to be rotatable relative to the upper rest.

Some embodiments are directed to a walker, including a frame, a front handle supported by the frame, a brake handle supported by the frame and disposed under the front handle, and a fall seat configured to rotate from a first position to a second position by the falling action of a user to catch the user. In some embodiments, the fall seat is coupled to the brake handle.

In some embodiments, a brake actuator is configured to couple the fall seat to the brake handle. In some embodiments, the fall seat is configured to actuate the brake handle when the fall seat is rotated from the first position to the second position. In some embodiments, the fall seat brake handle is configured to automatically actuate when the fall seat is rotated from the second position to the first position. In some embodiments, the fall seat brake handle may be released when the walker is in the wheelchair configuration.

In some embodiments, the fall seat includes a first side and a second side opposing the first side, wherein the first side of the fall seat is coupled to the brake handle. In some embodiments, the fall seat includes a first side and a second side opposing the first side, wherein the first side and the second side of the fall seat is coupled to the brake handle. In some embodiments, the walker includes a rear wheel, a front wheel, and an anti-tip wheel disposed in front of the rear wheel and the front wheel. In some embodiments, the front wheel is configured to pivot relative to the frame. In some embodiments, the walker includes a rear wheel, a front wheel, and an anti-tip wheel, the front wheel being disposed between the rear wheel and the anti-tip wheel.

BRIEF DESCRIPTION OF THE DRAWINGS/FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
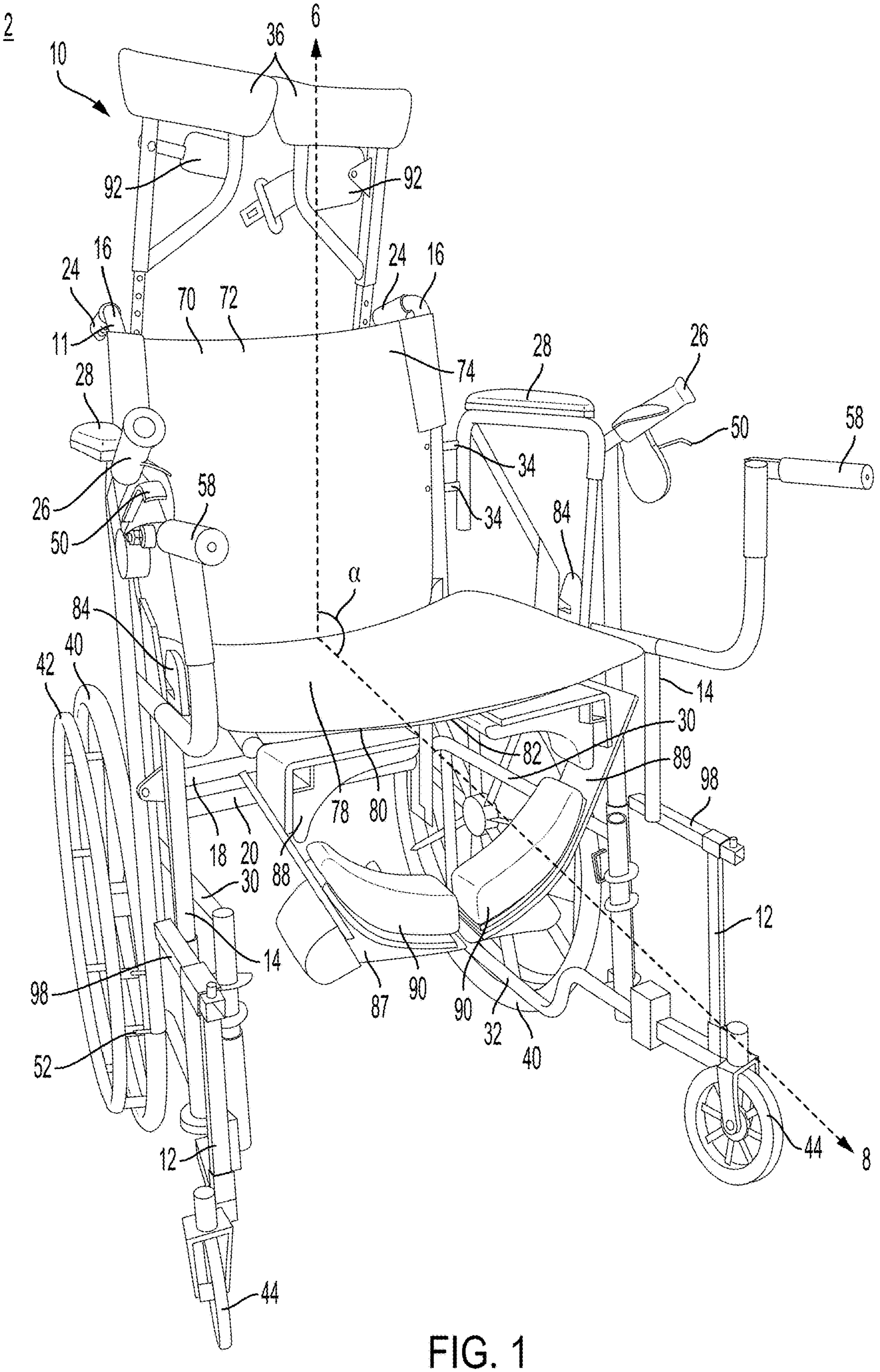
FIG. 1 shows a perspective view of a convertible wheelchair according to some embodiments.

The features and advantages of the embodiments will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION OF THE INVENTION

The present inventions will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present inventions. Other suitable modifications and adaptations of the variety of conditions and parameters normally encountered in the field, and which would be apparent to those skilled in the art, are within the spirit and scope of the inventions.

As used herein, the term "approximately" is inclusive of the number to which it refers and includes numbers that bound and are within a range of 10-15% except where such number would exceed 100% of a possible value.

Systems and methods described herein are directed to a convertible wheelchair having a wheelchair configuration and a walker configuration. The wheelchair configuration can provide a user with mobility while seated. Similarly, the walker configuration can provide mobility to the user in a standing position. The convertible wheelchair system can easily be converted to the wheelchair configuration or the walker configuration. For example, one person, who may be the user, can independently convert the system. The system may be used and converted by users who have physical limitations or impairments, including those who have limited or no use of their arms. Additionally, the convertible wheelchair can be quickly disassembled to provide modularity for transport or storage. The improved functioning and construction of the convertible wheelchair facilitate dynamic mobility for users while enabling comfortable and independent operation.

The convertible wheelchair can include a chair that can be adjusted to fit a user in the wheelchair configuration. The chair can be raised and lowered depending on the user's desired positioning. The chair can be foldable and can include a chair back and a chair seat. In the wheelchair configuration, the chair back and the chair seat can extend generally perpendicularly relative to each other. In this way, the chair back and chair seat create a chair in which the user can sit. The user can propel the convertible wheelchair forward while seated. Accordingly, the convertible wheelchair in the wheelchair configuration provides the user with mobility while seated.

To convert the convertible wheelchair from the wheelchair configuration to the walker configuration, the user can rotate the chair seat such that it is adjacent to the chair back. In this way, the chair can be foldable to allow for rotation of the chair seat relative to the chair back. The user can stand within the convertible wheelchair in the walker configuration in the space previously occupied by the chair seat. In some embodiments, the chair can include a fastener to maintain the chair seat in a position that is adjacent to the chair back. Because the chair is folded, the user benefits by having additional room to move within the convertible wheelchair. Folding the chair advantageously limits the vertical extension of the chair, which provides the user with space behind their upper legs, for example. In contrast, unfolding the chair such that the chair seat becomes coplanar with the chair back adds vertical extension. Unfolding a chair outwardly and creating vertical extension may obstruct a user's legs, impeding movement.

Embodiments described herein provide mobility in both seated and standing positions. The convertible wheelchair can be quickly and easily converted between the wheelchair configuration and the walker configuration, allowing for dynamic mobility such that users can adapt to the demands of daily life. For example, a user may wish to be seated to travel to a destination without risking injury or overexertion.

However, when the user is in one location for an extended period of time, they may wish to stand and/or walk for exercise and general physical and mental health. Further, a user may participate in rehabilitation exercises in which intermittent walking mobility is desirable to build gait mobility, strength, or stamina. Additionally, the user may wish to stand to reach a higher placed or overhead item as they conduct their daily life. A user may also wish to stand to interact at eye level with others who are standing. By providing the ability to stand and walk, the user may feel a sense of dignity or self-esteem. Accordingly, the convertible wheelchair provides flexibility for users and allows them to effectively and efficiently conduct their daily lives.

As will be described herein, the chair seat can have a bottom surface from which a torso support can extend. The torso support can secure around a front of a torso of the user. As in the wheelchair configuration, the chair can be adjustable in the walker configuration. For example, the chair can be raised to position the torso support at the vertical level of an abdomen region of the user when standing. The torso support can secure around the abdomen region, and can extend to the front of the torso of the user. In this way, the convertible wheelchair can support and stabilize the user in the walker configuration while providing freedom of movement in a standing position.

Injury risk prevention when standing or walking is critical for elderly users, as they can be vulnerable to hip injuries from falling, other bone fractures, and even brain injuries. Assistive devices, such as wheelchairs and walkers that tip or fall can cause users to sustain one or more of these injuries. As an assistive device increases in height, a stronger base is required to provide balance and stability. Recognizing that users have different physical needs, the convertible wheelchair can provide support as desired. For example, the torso support can secure around an abdomen region of the user and can extend around a front of the user's torso to reduce the risk of the user tipping or falling forward in the walker configuration. Some users, such as elderly users and patients who struggle with walking mobility, desire, and may require, advanced support to remain upright and feel secure. This can provide them with the confidence to continue standing or walking. For additional support, embodiments provide a second torso support that can extend around a chest area of the user. The second torso support, alone or in combination with the abdomen region torso support, can retain a user if they begin to tip or fall. In this way, a user does not need to actively grasp a structure to stop from tipping or falling.

Indeed, in some embodiments multiple actuators may be included, such as a first actuator to begin raising the seat to a walker configuration. In some embodiments, a second actuator may be configured to lift up integral crutches, such that a user may be raised into a standing position either as an assistance measure or a complete lifting measure. In some embodiments, the chair lifts the back of the seat upwards at the outset in order to aid the user in standing, and then the seat of the chair moves away such that the user is left in a standing position.

In some embodiments, a movable seat is provided to catch the user if they fall. The movable seat can be secured to the chair seat and can rotate outwardly by the user's falling action. By rotating outwardly, the movable seat can extend generally perpendicularly relative to the chair seat, as the chair seat is maintained in a position adjacent to the chair back. The movable seat can rotate outwardly to catch the user if they fall. In this way, the convertible wheelchair described herein can provide multiple securing and stabilizing mechanisms to support the user as they stand and walk. In addition, the user may decide to sit while they are standing or walking to rest. The movable seat can be deliberately rotated outwardly by the user to provide a seat for the user if they decide to rest, for example. As the user returns to a standing position, the movable seat can be rotated to return to a position adjacent to the chair seat. The user can then stand and move in the space previously occupied by the movable seat in the walker configuration.

In some embodiments, as a user enters and leaves the convertible wheelchair, structural aspects of the convertible wheelchair frame can provide additional stability and support. For example, bars extending forwardly and positioned lower to the ground can be used as leverage for the user as they transition from the chair of the convertible wheelchair to another seat (e.g., a car seat, a hospital wheelchair, a living room chair, etc.). These additional bars can prove a structural support for users to grasp as they transition into and out of the convertible wheelchair. Embodiments additionally provide a hand brake and a safety brake that can easily be engaged to stop movement of the convertible wheelchair. As the user transitions into and out of the convertible wheelchair and between the wheelchair and walker configurations, they may wish to immobilize the convertible wheelchair. Quick actuation of one or more brakes can provide further stability. Additionally, if the user anticipates falling as they are standing or walking, they can immediately actuate one or more brakes to stabilize the convertible wheelchair to reduce the risk of injury.

The convertible wheelchair can positively affect caregivers and healthcare professionals as well. Because users of the convertible wheelchair are able to support themselves in a range of positions, they gain independence, allowing caregivers and healthcare professionals to attend to other matters. Additionally, users experience less instability, which eases the physical duties caregivers and healthcare professionals sometimes have in order to support those who require assistive devices. The mental burden on these stakeholders from care and concern is also relaxed, as users of the convertible wheelchair are safe and self-sufficient.

Embodiments also provide modularity. As described herein, the chair can be removable. The frame can also be taken apart easily such that the convertible wheelchair can be compactly stored for transport. This configuration can be advantageous in applications where users require frequent transportation, such as for hospital or rehabilitation visits. In some embodiments, the convertible wheelchair can be provided in a kit. The kit can include the parts of the convertible wheelchair for assembly. In some embodiments, a conversion kit can be available with tools and/or parts to convert an existing wheelchair into the convertible wheelchair described herein.

Additional systems and methods described herein are directed to a convertible walker having a walker configuration and a wheelchair configuration. In the walker configuration, the convertible walker system can provide a user with mobility in a standing position and safety mechanisms to reduce the risk of the user tipping or falling. Accordingly, the system can be converted to the wheelchair configuration if the user is at risk of tipping or falling. The system may be used and converted by users who have physical limitations or impairments, including those who have limited or no use of their arms. The convertible walker can also be foldable to facilitate transportation or storage. The improved functioning and construction of the convertible walker facilitate dynamic mobility for users while enabling comfortable and independent operation.

The convertible walker can include one or more back rests to support a user in the walker configuration. In some embodiments, an upper rest can be positioned proximate to a lower back of a user and a lower rest can be positioned below the upper rest.

As will be described herein, a torso support can extend from the lower rest. The torso support can secure around a front of a torso of the user, such as around an abdomen region of the user. As with the convertible wheelchair, the torso support of the convertible walker can reduce the risk of the user tipping or falling forward in the walker configuration. In addition to securing the user in an upright position to allow the user to confidently and steadily stand or walk, the torso support can be attached to the frame of the convertible walker to allow for hands-free driving of the convertible walker. In other words, the user can secure the torso support around their torso such that, as they walk, the convertible walker is propelled forward as well. This allows for hands-free movement of the convertible walker in comparison to walkers that require active grasping and pulling of handles to propel forward.

In some embodiments, the torso support can include two ends that each extend to a front of a torso. In some embodiments, the frame of the wheelchair can include attachments to secure the torso support when not in use. In some embodiments, the attachments can be magnets. Accordingly, the torso support can magnetically latch to the magnets on the frame.

The lower rest can also be coupled to a fall seat configured as a swing seat, such that it is a rotatable seat that is rotated by the falling action of the user to catch the user. Such a fall seat configured as a swing seat and the lower rest can be coupled such that the user is seated on the lower rest when the fall seat is rotated by the falling action of the user. Once rotated, the fall seat/swing seat can become a chair that the user can be seated on, thereby breaking their fall. The fall seat/swing seat can be biased and can rotate back to an initial position as the user returns to a standing position.

The user being seated on the fall seat can convert the convertible walker to the wheelchair position. The convertible walker can include handles that can be pushed to propel the convertible walker forward in the wheelchair position.

The convertible walker can include a brake that can be engaged to stop movement of the convertible walker. As with the convertible wheelchair, the user may wish to immobilize the convertible walker as they transition into and out of the convertible walker. In some embodiments, the fall seat can be coupled to a brake handle. Accordingly, as the fall seat is rotated by the falling action of a user to catch the user, the brake handle can be pulled to actuate a brake and stabilize the convertible walker to reduce the risk of injury. The brake can remain actuated as the user returns to a standing position such that the convertible walker is secured between the wheelchair and walker configurations. In some embodiments, the user can release the brake from an actuated position when seated, thereby allowing the walker to be used as a wheelchair. In some embodiments, the brake may engage and automatically be actuated as a user begins to stand up, thereby fixing the walker in place to increase stability and not let the walker/wheelchair slip away as the user stands up. In some embodiments, the brake may engage and manually be actuated as a user begins to stand up, thereby fixing the walker in place to increase stability and not let the walker/wheelchair slip away as the user stands up.

As described herein, the convertible walker can be foldable. In this way, the convertible walker can be easily stored or transported. The convertible walker can include a back support frame member that can be foldable. In addition, the fall seat can be foldable at an intermediate portion of the fall seat. Accordingly, the convertible walker can be collapsed inward, or folded.

The convertible walker can include components of the convertible wheelchair or can be compatible with components of the convertible wheelchair. For example, the convertible walker can receive an outer wheel of the convertible wheelchair to provide the convertible walker with additional stability and balance in the wheelchair configuration. In this way, the convertible walker can lower the risk of tipping or falling.

The convertible walker can include one or more sets of wheels for use in both the walker and wheelchair configurations. In some embodiments, the convertible walker can include an anti-tip device including an anti-tip wheel, thereby improving safety. The anti-tip wheel can be disposed between a rear wheel and a front wheel of the convertible walker. To secure the convertible walker when traversing obstacles such as curbs and debris, the anti-tip wheel can be engaged, and the anti-tip wheel is positioned generally off the ground relative to the other wheels in a range of about 0.5 inches to about 2.0 inches. In this way, the anti-tip wheels may engage the ground, for example when the front wheels of the walker hit an object—the walker may safely tilt forward until the anti-tip wheels engage and prevent the walker from tilting further, and allow the user to navigate over the object. The anti-tip wheel can be pivoted relative to the frame of the convertible walker to engage the anti-tip wheel such that the anti-tip wheel is ahead of the front wheel. In some embodiments the anti-tip wheel may pivot horizontally to the engaged position. In some embodiments the anti-tip wheel may pivot vertically to the engaged position. Accordingly, the front wheel can be disposed between the rear wheel and the anti-tip wheel. As the user approaches an obstacle, the anti-tip wheel can pass over the obstacle. The convertible walker can be prevented from tipping, as the weight of the convertible walker is concentrated rear of the anti-tip wheel. The front wheel can then pass over the obstacle. Because the anti-tip wheel is head of the front wheel, the convertible walker can again be prevented from tipping.

Based on the foregoing, assistive devices, such as wheelchairs and walkers, are essential devices for providing freedom of mobility to users requiring additional support. The convertible wheelchair and convertible walker described herein can provide both seated and standing support to easily and effectively expand the user's mobility range. The convertible wheelchair and convertible walker will be described further with reference to the figures.

As shown in FIG. 1, a convertible wheelchair 10 can include a frame 11 and a chair Frame 11 can support chair 70. Frame 11 can include rear vertical members 16, push handles 24, front handles 26, arm rests 28, intermediate horizontal members 30, lower horizontal members 32, and chair seat links 34. Chair seat links 34 can be intermediate to rear vertical members 16 and arm rests 28.

As shown, convertible wheelchair 10 can be in a wheelchair configuration 2. In wheelchair configuration 2, a user can be seated in chair 70 of convertible wheelchair 10. Chair can include a chair back 72, a chair back front surface 74, a chair seat 78, a chair seat top surface 80, and a chair seat bottom surface 82. In wheelchair configuration 2, the user can sit directly on chair seat top surface 80 of chair seat 78. While seated, chair back 72 can provide back support. In some embodiments, chair back 72 can be angled such that the user leans back when seated in chair 70. This can help to reduce the risk of the user tipping or falling. In some embodiments, chair seat 78 may be configured to tilt or swing such that a user can sit or stand and chair seat 78 follows the point of contact of the user.

Chair back 72 can define a plane, in which an axis 6 lies. Additionally, chair seat 78 can define a plane, in which an axis 8 lies. Axis 8 can extend from axis 6 at an angle $\alpha$. In some embodiments, in wheelchair configuration 2, in which a user can be seated, angle $\alpha$ can be between approximately 70 degrees and approximately 120 degrees, such as between approximately 80 degrees and approximately 110 degrees, such as approximately 90 degrees. Accordingly, chair back 72 and chair seat 78 can extend generally perpendicularly relative to each other.

In some embodiments, chair seat 78 may function as a "fall seat," such that it may catch a user when falling. In some embodiments, chair seat 78 may be fixed in a single position. In some embodiments, chair seat 78 may be configured to raise at a rear portion and lower at a front portion, such that when a user stands, the chair seat 78 pivots and/or slides away towards chair back 72 such that the user can stand in the space previously occupied by chair seat 78. In some embodiments, actuators such as levers, arms, linkages, springs, dampers, motors, etc., may be included such that the chair seat 78 may move back and forth between a sitting position and a standing position, e.g., as a fall seat. In some embodiments, chair seat 78 pivots up or down such that the user may naturally position it when standing. In some embodiments, a seatbelt may be provided to secure user with respect to the chair back 72, such that it moves the pivot direction even when chair seat 78 may move out of the way, e.g., when the user stands. In some embodiments, the seatbelt may include a pair of magnets on opposite sides of the closure, such that it aids the user in coupling the seatbelt. In this way, the seatbelt may control the movement of the chair seat 78, particularly when in use as a "fall seat," for example, when a point on the linkage is fastened to a seatbelt attachment point. In some embodiments, chair seat 78 slides (e.g., as a slide seat) backwards on a track/pin such that the user may naturally position it when standing. In some embodiments, a seatbelt may be provided to secure user with respect to the chair back 72, such that it moves along a track even when chair seat 78 may move out of the way, e.g., when the user stands. In this way, the seatbelt may control the movement of the chair seat 78, particularly when in use as a "fall seat," or a slide seat.

In some embodiments, chair seat 78 may function as a "lift seat," such that it may assist a user with standing. In some embodiments, chair seat 78 may be configured to raise at a rear portion and slide rearward along a track, e.g., by use of an actuator such as levers, arms, linkages, springs, dampers, motors, etc., thereby assisting the user to stand up from a sitting position. In some embodiments, at the same time that the lift seat is actuating upward, one or more of crutches 36 on convertible wheelchair 10 may be automatically raised, further assisting the user in standing. Adjusting crutches 36 may include, for example, raising or lowering crutches 36 vertically, and shifting crutches 36 horizontally. In this way, even individuals that may not be able to stand on their own may be assisted with standing via convertible wheelchair 10, for example such that blood flow to the lower extremities may be increased, or a user may simply stand to perform tasks that otherwise would be difficult while sitting, for example. Even simply standing up to talk to another person is made possible for those who it may be difficult or otherwise impossible to do so.

In some embodiments, a roller may be included at the front edge of the chair seat 78, such that when pivoting from a standing to sitting configuration, or vice versa, the contact point between the user and the chair may easily translate as the user stands or sits. This is in contrast to a seat without a roller at the front edge, where friction between the user and the edge of the seat makes it harder to sit (or stand), while the user is in contact with chair seat 78.

In some embodiments, the chair seat 78 may automatically move out of the way when the user stands up, and may automatically move to a sitting position when the user sits. In some embodiments, a locking mechanism may be provided to lock one or more of the chair back 72 and chair seat 78 in position. In some embodiments, the chair back 72 and/or the chair seat 78 are adjustable in one or more dimensions to accommodate different user's anatomies (e.g., length and proportions of legs, arms, torso, etc.).

In some embodiments, convertible wheelchair 10 can also include brake handles 50, brakes 52, and safety handles 58. Frame 11 can also include front vertical members 12, brake members 14, and stability bars 98, and can support side wheels 40, outer wheels 42, and front wheels 44. In some embodiments, outer wheels 42 can extend outwardly from frame 11. By extending frame 11 at a lower portion of convertible wheelchair 10, outer wheels 42 can provide additional stability and balance to convertible wheelchair 10 to lower the risk of tipping or falling.

A user can independently operate convertible wheelchair 10. For example, convertible wheelchair 10 can be motorized such that a user can actuate a motor to propel convertible wheelchair 10. Additionally or alternatively, a second user can utilize push handles 24 to propel convertible wheelchair 10. Brake handles 50 and safety handles 58 can be actuated to engage brakes 52. Front wheels 44 can be supported by front vertical members 12. Stability bars 98 can extend from front vertical members 12. Brake handles 50, brakes 52, safety handles 58, and stability bars 98 will be described further below.

In some embodiments, convertible wheelchair 10 can include a lower torso support first end 88 and a lower torso support second end 89. Lower torso support first end 88 and lower torso support second end 89 can be opposing ends of a lower torso support and can be attached to chair seat bottom surface 82. In some embodiments, each of lower torso support first end 88 and lower torso support second end 89 can include one or more cushions 90. In some embodiments, one or more lower torso support belts 87 can extend from one or more of lower torso support first end 88 and lower torso support second end 89. In some embodiments, convertible wheelchair 10 can include one or more crutches 36. In some embodiments, crutches 36 can be positioned behind chair back 72. In some embodiments, crutches 36 can provide head and/or neck support for a user seated in wheelchair configuration 2. In some embodiments, crutches 36 can include cushioning to provide a comfortable head and/or neck support for the user. In some embodiments, crutches 36 can be removable. In some embodiments, crutches 36 can be fixed to convertible wheelchair 10. For example, crutches 36 can be fixed in position and prevented from being moved vertically or horizontally. In some embodiments, crutches 36 can be adjustable on convertible wheelchair 10. Adjusting crutches 36 on convertible wheelchair 10 can include raising or lowering crutches 36 vertically, and shifting crutches 36 horizontally. Lower torso support first end 88, lower torso support second end 89, cushions 90, lower torso support belts 87, and crutches 36 will be described further below.

Figure 2:
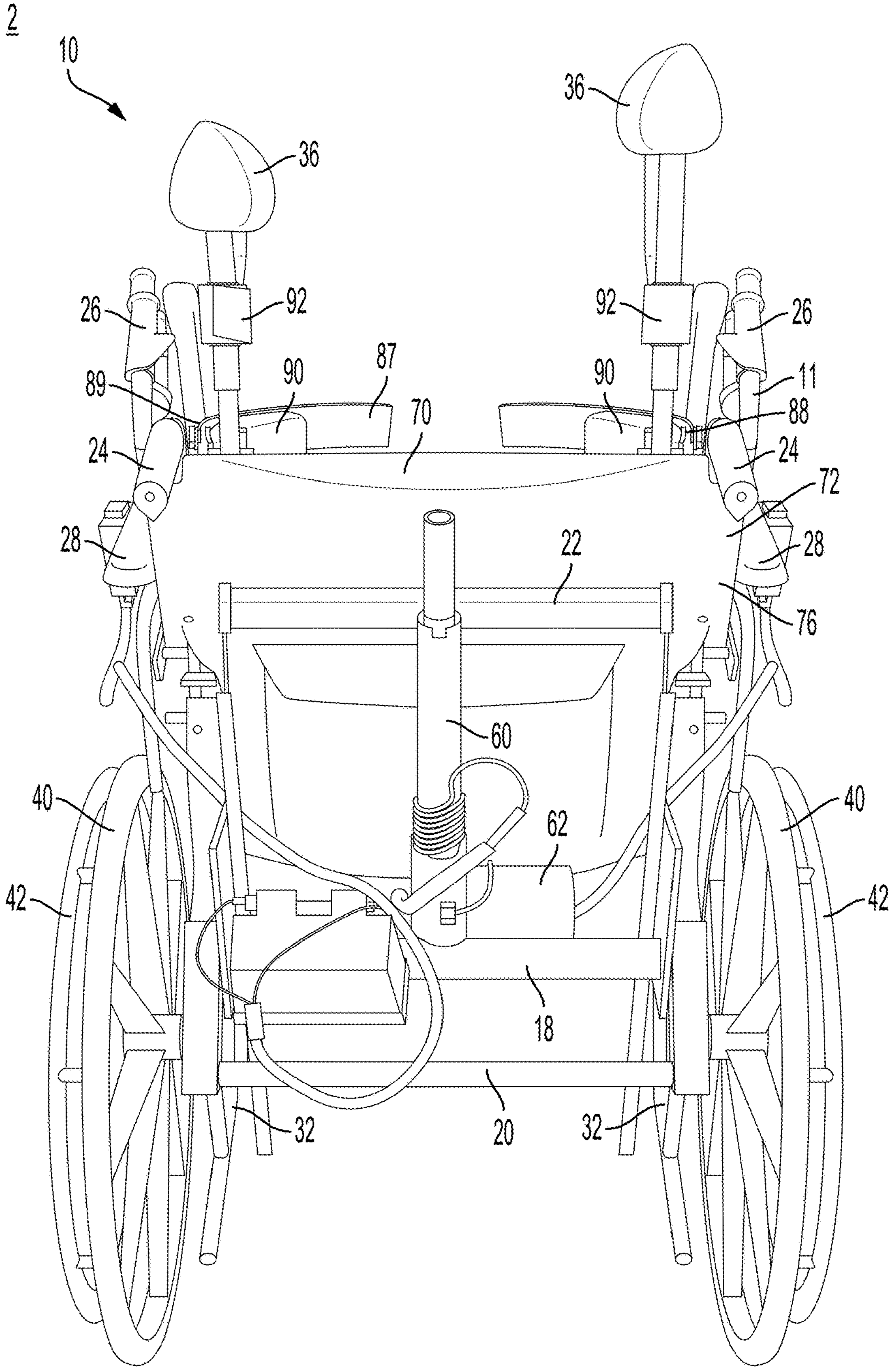
FIG. 2 shows a rear side view of the convertible wheelchair of FIG. 1.

Chair 70 can be supported by frame 11. As shown in FIG. 2, frame 11 can include an intermediate back member 18, a lower back member 20, and an upper back member 22. Chair back 72 can include a chair back rear surface 76. Upper back member 22 can support chair back 72. As shown, chair back rear surface 76 can be attached to upper back member 22. Lower back member 20 can provide horizontal structural support to convertible wheelchair 10. Convertible wheelchair 10 can include a rear cylinder 60 and an electric motor 62 supported by frame 11, which may serve as an elevating mechanism (and in some embodiments may be used as part of the "lift seat" as described herein). In some embodiments, rear cylinder 60 and electric motor 62 can be supported by intermediate back member 18 and/or upper back member 22. In some embodiments, rear cylinder 60 can be a linear actuator that can vertically displace chair 70. In some embodiments, rear cylinder 60 can be displaced by electric motor 62. In some embodiments, chair 70 can include this and/or other elevating mechanisms. In some embodiments, chair 70 can be displaced mechanically. In some embodiments, chair 70 can be adjusted vertically while convertible wheelchair 10 is in wheelchair configuration 2.

In some embodiments, chair 70 can be adjusted to better fit a user. For example, a taller user may require a greater distance between chair seat 78 and the ground to accommodate their longer legs. This user may raise chair 70 to increase the distance between chair 70 and the ground. Similarly, a shorter user may require a smaller distance between chair seat 78 and the ground to accommodate their shorter legs. This user may lower chair 70 to decrease the distance between chair 70 and the ground. In some embodiments, when a user enters convertible wheelchair 10, a higher chair seat 78 can help a user to reach a seated position in wheelchair configuration 2, as chair seat 78 in a higher position is closer to their backside. Accordingly, a user may raise chair 70 prior to sitting on chair 70 when convertible wheelchair 10 is in wheelchair configuration 2. As a higher chair 70 is desirable when entering convertible wheelchair 10, a higher chair 70 may also be desirable when exiting. In some embodiments, chair 70 can be vertically adjusted to exit convertible wheelchair 10. For example, chair 70 can be raised to reach a level height with an external chair (e.g., a living room chair) or a bed to transition a user to the chair or bed. In some embodiments, chair 70 can be vertically adjusted incrementally. In some embodiments, a control can be actuated by the user to vertically displace chair 70. The control can be separate from convertible wheelchair 10, as in supported by a handheld device (e.g., a remote or a smartphone) and/or can be integrated into convertible wheelchair 10 (e.g., situated on arm rests 28).

Figure 3:
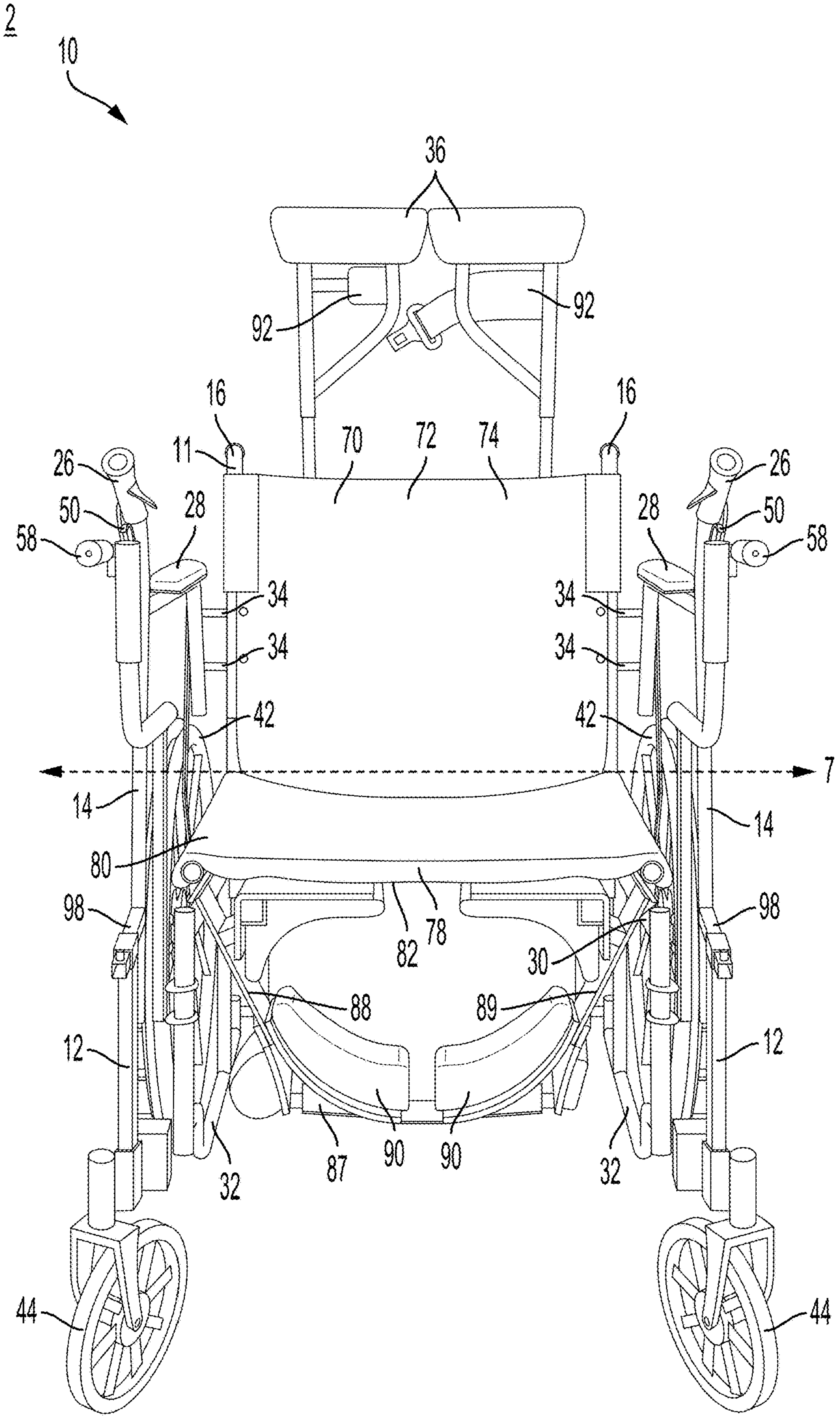
FIG. 3 shows a front side view of the convertible wheelchair of FIG. 1.
Figure 4:
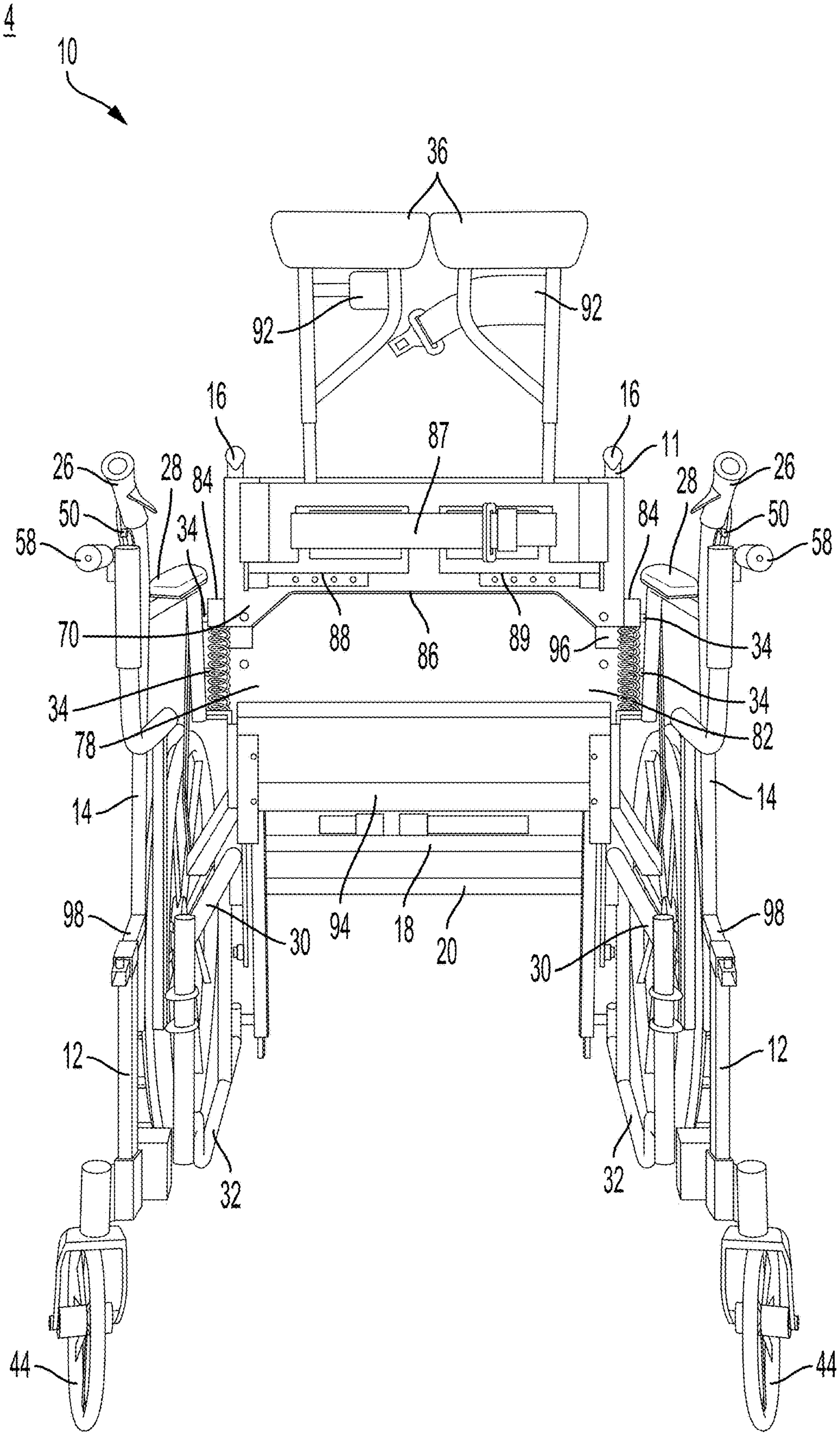
FIG. 4 shows a front side view of the convertible wheelchair of FIG. 1.

Chair 70 in a higher vertical position is shown in FIG. 3. In some embodiments, a higher chair seat 78 can also help a user exit convertible wheelchair 10 to transition to a standing position. As convertible wheelchair 10 is converted from wheelchair configuration 2 to a walker configuration 3 (FIG. 4), the user can readily lift themselves from a raised chair 70. In this way, the user does not exert as much effort to stand. In contrast, if chair 70 were lower, the user would need to lean more on their legs and support their weight to lift themselves up into a standing position. Some users who have physical limitations either are unable to lift themselves in this way or are advised to limit their physical exertion to reduce the risk of injury and preserve their health. Accordingly, the vertical adjustment of chair 70 can facilitate easier transitioning between a seated position in wheelchair configuration 2 and a standing position in walker configuration 3 (FIG. 4). Relying less on their legs by raising chair seat 78 can better support users and reduce the risk of injury.

Chair seat 78 can be rotatably coupled to chair back 72. Accordingly, in some embodiments, chair 70 can be foldable. With reference to FIGS. 3-4, chair seat 78 can be rotated in both wheelchair configuration 2 and walker configuration 4. In wheelchair configuration 2, chair seat 78 can be rotated to be generally perpendicular to chair back 72. Rotating chair seat 78 outwardly in this way can allow a user to sit in chair 70. When a user decides to stand and use walker configuration 4 of convertible wheelchair 10, the user may desire to clear the space occupied by chair seat 78. By rotating chair seat 78 to be adjacent to chair back 72, the space within convertible wheelchair 10 is cleared to allow the user to stand within convertible wheelchair 10. Because chair 70 is folded to position chair seat 78 adjacent to chair back 72, the user benefits by having additional room to move within the convertible wheelchair 10. Folding chair 70 advantageously limits the vertical extension of chair 70, which provides the user with space behind their upper legs, for example. In contrast, unfolding chair 70 such that chair seat 78 becomes coplanar with chair back 72 adds vertical extension. Chair seat 78 may extend downward toward a user's legs or ankles if chair 70 is unfolded in this way. Any contact or barrier created by chair seat 78 can impede movement. For a user who already experiences limited mobility, creating space rather than impeding movement is desirable and increases the scope of movability. By folding chair 70 such that chair seat 78 is adjacent to chair back 72, a user is better able to expand their range of motion and experience the dynamic mobility provided by convertible wheelchair 10.

As shown in FIG. 3, an axis 7 can extend along the interface between chair seat 78 and chair back 72. Chair seat 78 can be rotatable around axis 7 to move between a folded position and an unfolded position. Chair 70 in a folded position, in which chair seat 78 is adjacent to chair back 72, is shown in FIG. 4. In this position, convertible wheelchair 10 can be in walker configuration 4, in which a user can stand or walk.

In walker configuration 4, chair seat 78 can be rotated such that chair seat 78 is adjacent to chair back 72. Chair seat 78 and chair back 72 can be adjacent such that chair seat top surface 80 and chair back front surface 74 are facing each other and/or in contact. Additionally, chair seat 78 and chair back 72 can be adjacent such that angle $\alpha$ (FIG. 1) is minimized. In this way, axis 8 (FIG. 1) can be generally parallel to axis 6 (FIG. 1) and chair seat 78 and chair back 72 can be generally parallel to one another. In some embodiments, in walker configuration 4, in which a user can be in a standing or walking position, angle $\alpha$ can be between approximately 1 degree and approximately 10 degrees, such as between approximately 2 degrees and approximately 8 degrees, such as approximately 5 degrees.

Figure 5:
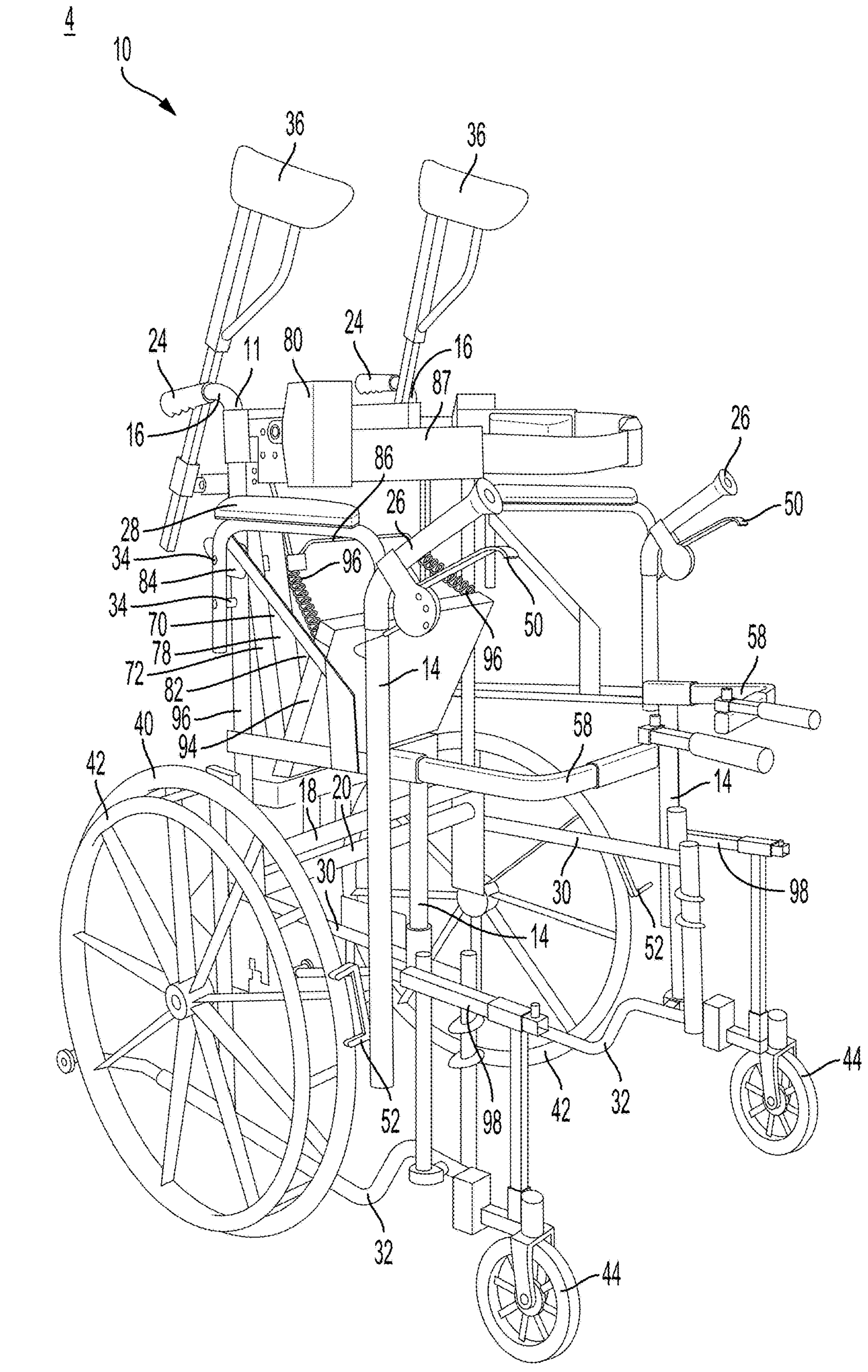
FIG. 5 shows a perspective view of the convertible wheelchair of FIG. 1.
Figure 6:
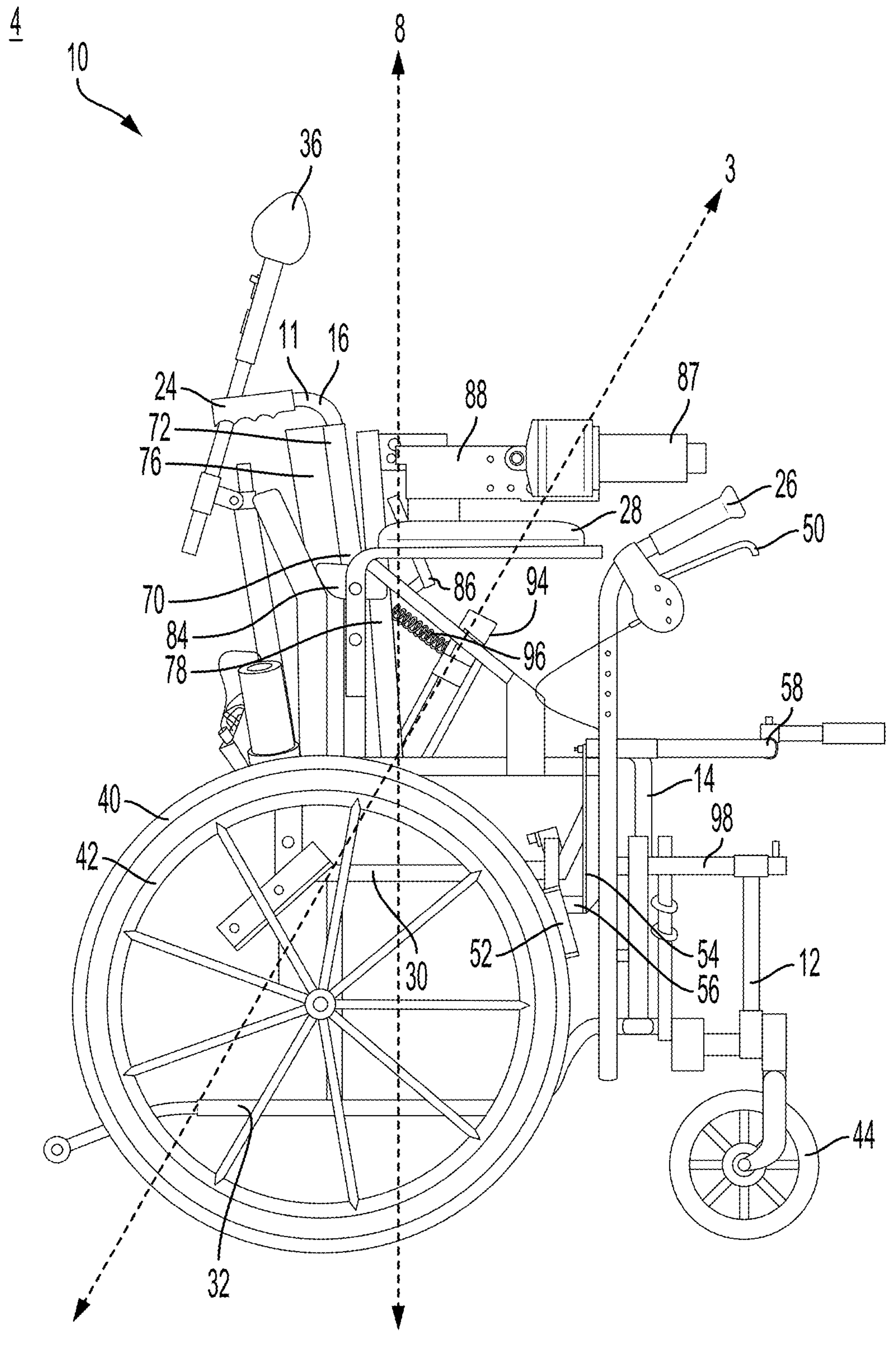
FIG. 6 shows a side view of the convertible wheelchair of FIG. 1.

Chair seat 78 can be maintained in a position that is adjacent to chair back 72. In some embodiments, chair 70 can include one or more fasteners 84. Fasteners 84 can maintain chair seat 78 adjacent to chair back 72 in walker configuration 4. Accordingly, fasteners 84 can maintain chair 70 in a folded position. As shown in FIGS. 5-6, fasteners 84 can hook onto chair seat links 34 of frame 11. In some embodiments, fasteners 84 can include openings that receive chair seat links 34 to releasably couple chair 70 to frame 11. As will be discussed further below, fasteners 84 can be releasably coupled to frame 11. In some embodiments, additionally or alternatively, chair seat 78 and chair back 72 can include hook-and-loop fasteners (e.g., Velcro™)

to maintain chair seat 78 adjacent to chair back 72. By folding inwardly, chair 70 can also be compact on convertible wheelchair 10. In this way as well, chair 70 can be limited in vertical extension. As discussed above, limiting the vertical extension of chair 70 can allow chair 70 to avoid contact with the user's legs, minimizing any obstruction to the user's legs from contact. The user can experience greater freedom of movement as a result.

As with wheelchair configuration 2 (FIG. 3), chair 70 can be vertically raised in walker configuration 4. Chair 70 can be vertically displaced when both unfolded and folded. With reference to FIG. 5, chair 70 can be raised to position lower torso support first end 88, lower torso support second end 89, cushions 90, and lower torso support belts 87 at the vertical level of an abdomen region of the user when standing.

As shown, lower torso support first end 88, and lower torso support second end 89 can extend to a front of a torso. In some embodiments, lower torso support first end 88 and lower torso support second end 89 can be rotatably coupled to chair seat bottom surface 82 such that they can be pivoted outwardly to extend around a torso. In some embodiments, lower torso support belts 87 extending from one or more of lower torso support first end 88 and lower torso support second end 89 can extend around a front of a torso. In some embodiments, lower torso support belts 87 can secure lower torso support first end 88 and lower torso support second end 89 around a front of a torso. In some embodiments, lower torso support belts 87 can be adjustable to fit around a user's waist. For example, lower torso support first end 88 and lower torso support second end 89 can be rotated outward to provide a user with a looser fit or to accommodate a larger waist area. In this position of lower torso support first end 88 and lower torso support second end 89, lower torso support belts 87 can be long enough to secure lower torso support first end 88 and lower torso support second end 89 around a front of a torso. In some embodiments, lower torso support first end 88 and lower torso support second end 89 can be pivoted inwardly to further secure around a torso of a user. In some embodiments, lower torso support belts 87 can be hook-and-loop straps and/or can include one or more buckles, micro-adjustments, and/or hook ends. Cushions 90 can be disposed along lower torso support first end 88 and lower torso support second end 89 to provide a cushioning effect and a comfortable lower torso support to the user.

Lower torso support first end 88, lower torso support second end 89, cushions 90, and lower torso support belts 87 can be support features that individually and together secure and stabilize a user as they stand and walk. As discussed above, users of assistive devices, such as convertible wheelchair 10 described herein, may experience temporary or physical ailments that cause them to lose the ability to stand or walk without additional support. These support features in walking devices aid users in remaining upright and resisting tipping or falling. The security and stability provided by these support features also give users confidence so that they may feel equipped and able to advance their standing and walking abilities. Additionally, such features provide the user with independence. Instead of requiring a caregiver at all times to monitor the user as they stand and walk, a user can freely stand and walk with support from these features. In this way, the user can gain self-reliance and competently conduct their daily lives unattended or with minimum supervision.

With reference to FIGS. 4-7, in some embodiments, convertible wheelchair 10 can include a fall seat 94 and springs 96. Fall seat 94 can extend from chair seat 78 and can be rotatably coupled to chair seat bottom surface 82. Fall seat 94 can rotate by the falling action of the user to catch the user. In this way, fall seat 94 is a movable seat that can support the user between wheelchair configuration 2 (FIG. 3) and walker configuration 4. Thus, convertible wheelchair 10 described herein can provide multiple securing and stabilizing mechanisms to support the user in standing and walking positions.

As shown in FIG. 4, fall seat 94 can be coupled to chair seat bottom surface 82 at a position that is lower than the lower torso supports, e.g., lower torso support first end 88, lower torso support second end 89, cushions 90, and lower torso support belts 87 (e.g., relative to axis 8 shown in FIG. 1). With reference to FIGS. 5-6, in some embodiments, fall seat 94 is biased to be positioned adjacent to chair seat 78. In some embodiments, fall seat 94 is coupled to chair seat bottom surface 82 via springs 96. Fall seat 94 can be biased by springs 96. As shown in FIG. 6, fall seat 94 can define a plane, in which an axis 3 lies. Axis 3 can extend relative to axis 8, which lies on a plane defined by chair seat 78, at an angle $\gamma$. Chair seat 78 and fall seat 94 can be adjacent such that angle $\gamma$ is minimized. In this way, axis 3 can be generally parallel to axis 8. In some embodiments, angle $\gamma$ in wheelchair configuration 2 (e.g., FIG. 3), in which a user can be seated, and in walker configuration 4, in which a user can be in a standing or walking position, can be between approximately 1 degree and approximately 30 degrees, such as between approximately 5 degrees and approximately 20 degrees, such as approximately 15 degrees.

Figure 7:
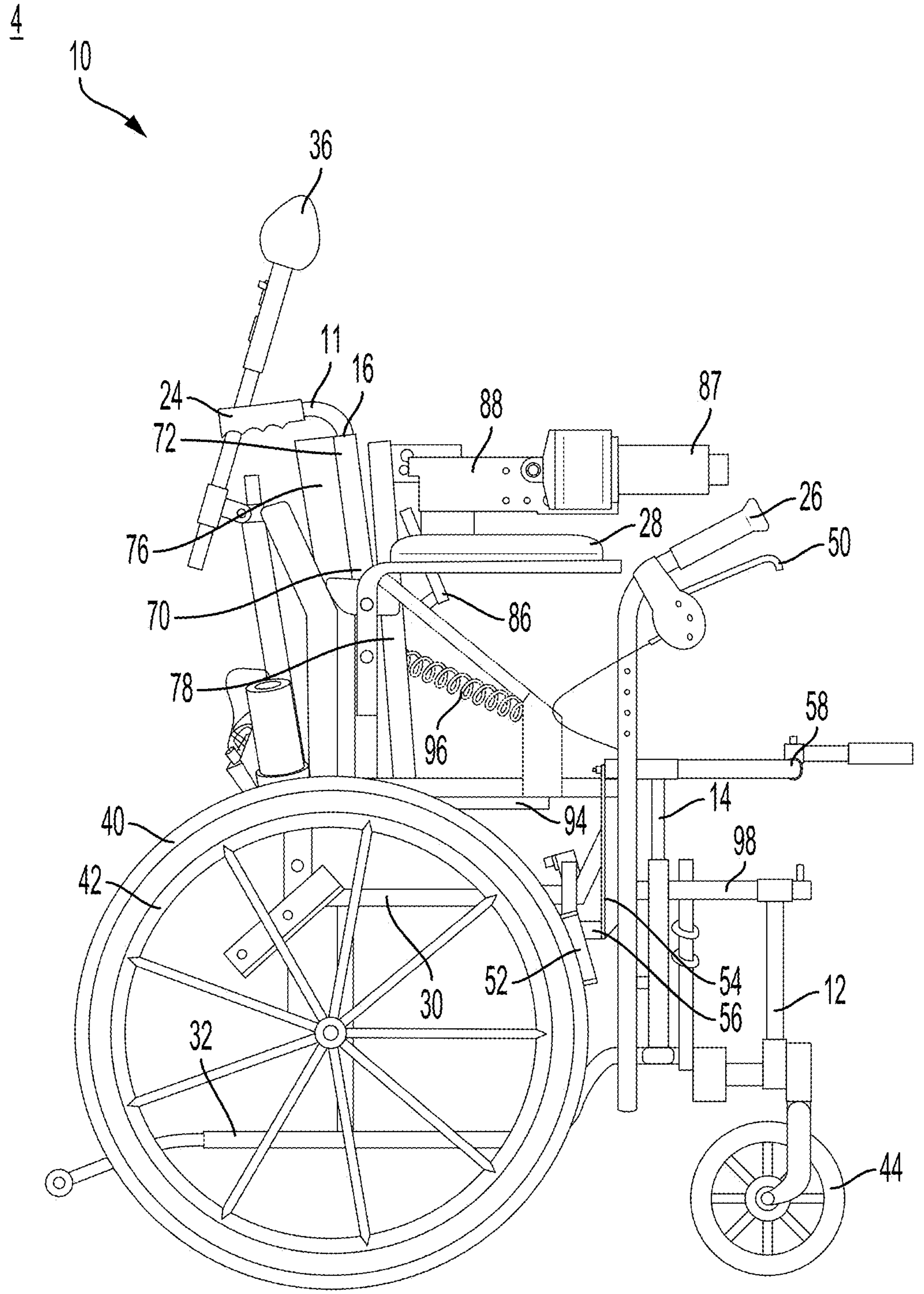
FIG. 7 shows a side view of the convertible wheelchair of FIG. 1.

If a user falls while standing or walking, fall seat 94 can rotate outwardly by the user's falling action. Accordingly, angle $\gamma$ can increase such that fall seat 94 is no longer positioned adjacent to chair seat 78. As shown in FIG. 7, angle $\gamma$ can be between approximately degrees and approximately 120 degrees, such as between approximately 80 degrees and approximately 110 degrees, such as approximately 90 degrees. Accordingly, chair seat 78 and fall seat 94 can extend generally perpendicularly relative to each other. When a user desires and is able to return to a standing position, fall seat 94 can rotate to return to its biased position in which fall seat 94 is positioned adjacent to chair seat 78. In addition, the user may decide to sit while they are standing or walking to rest. Fall seat 94 can be deliberately rotated outwardly by the user to provide a seat for the user if they decide to rest, for example. The user can push into fall seat 94 with their backside to outwardly rotate fall seat 94. In some embodiments, fall seat 94 is automatically rotated to return to its biased position via springs 96. In some embodiments, fall seat 94 can be latched to chair seat 78. Fall seat 94 can be unlatched to be rotatable relative to chair seat 78. As the user returns to a standing position, fall seat 94 can be rotated to return to a position adjacent to chair seat 78. The user can then stand and move in the space previously occupied by fall seat 94 in walker configuration 4.

Chair 70 can be adjusted vertically to position chair seat 78 adjacent to a user's backside. If a user is taller, chair 70 can be raised to a greater height than if the user is shorter. In this way, fall seat 94 attached to chair seat 78 can also be ideally positioned relative to the user. If the user begins to tip or fall, or wishes to rest, their downward movement can outwardly rotate fall seat 94.

Convertible wheelchair 10 provides stability additionally with the use of brakes 52. While in walker configuration 4 or wheelchair configuration 2 (FIG. 1), the user can actuate brakes 52 to stabilize convertible wheelchair 10. In some embodiments, brakes 52 can be actuated by depressing brake handles 50. In some embodiments, brake handles 50 can extend from front handles 26. In some embodiments, brakes 52 can apply a friction force against side wheels 40 to cease movement of convertible wheelchair 10. In some embodiments, brakes 52 are coupled to brake handles 50 by vertical links 54 and horizontal links 56. In some embodiments, actuating brake handles 50 can engage brakes 52 against side wheels 40. In some embodiments, releasing brake handles 50 can disengage brakes 52 from side wheels 40. If a user begins to tip or fall while standing or walking in walker configuration 4, the user can quickly actuate brakes 52 to stop movement of convertible wheelchair 10 and reduce the risk of injury.

In some embodiments, convertible wheelchair 10 includes safety handles 58, discussed above. In some embodiments, safety handles 58 can be additional brakes positioned in front of a user of convertible wheel chair 10. As shown, in some embodiments, safety handles 58 are positioned in front of the user such that the user cannot enter or exit convertible wheelchair 10 without moving safety handles 58 out of the way. Safety handles 58 positioned in front of a user within convertible wheelchair 10 can indicate that convertible wheelchair 10 (and a user positioned in convertible wheelchair 10) is mobile. Safety handles 58 also provide grasping surfaces for the user. The user can grip safety handles 58, as convertible wheelchair 10 is mobile to feel control and security over the device. In some embodiments, front handles 26 and/or safety handles 58 may be used by a user to step into and out of a vehicle, on or off a commode, on or off a separate chair or other seat, etc.—without assistance. As discussed above, the security and stability provided by these support features also give users confidence so that they may feel equipped and able to advance their standing and walking abilities. Additionally, such features provide the user with independence. Instead of requiring a caregiver at all times to monitor the user as they stand and walk, a user can freely stand and walk with support from these features. In this way, the user can gain self-reliance and competently conduct their daily lives unattended or with minimum supervision.

In some embodiments, if a user is in convertible wheelchair 10 in wheelchair configuration 2 (FIG. 1), the user must exit convertible wheelchair 10 to convert convertible wheelchair 10 to walker configuration 4. Once convertible wheelchair 10 is in walker configuration 4, the user can reenter convertible wheelchair 10. Similarly, in some embodiments, if a user is in convertible wheelchair 10 in walker configuration 4, the user must exit convertible wheelchair 10 to convert convertible wheelchair 10 to wheelchair configuration 2 (FIG. 1). Once convertible wheelchair 10 is in wheelchair configuration 2 (FIG. 1), the user can reenter convertible wheelchair 10. In some embodiments, safety handles 58 must be rotated away to permit a user to exit or enter convertible wheelchair 10. In some embodiments, when safety handles 58 are rotated away (e.g., towards side wheels 40), brakes 52 can be actuated via vertical links 54 and horizontal links 56 to immobilize convertible wheelchair 10. Immobilizing convertible wheelchair 10 allows a user to enter and exit while convertible wheelchair 10 is stabilized. As discussed, safety handles 58 provide grasping surfaces as well. Accordingly, as a user enters and exits convertible wheelchair 10, they may grip safety handles 58 for support. By leveraging safety handles 58 while convertible wheelchair 10 is stabilized, users can lift themselves out of or lower themselves into convertible wheelchair 10 without fear of losing control of the same. In this way, as a user positions themselves in walker configuration 4 or wheelchair configuration 2 (FIG. 1), the user can feel secure, and any potential injury is minimized or prevented. Additional examples of safety handles 58 are found in U.S. Pat. No. 6,431,572 B1, the disclosure of which is hereby incorporated herein by reference in its entirety.

Figure 8:
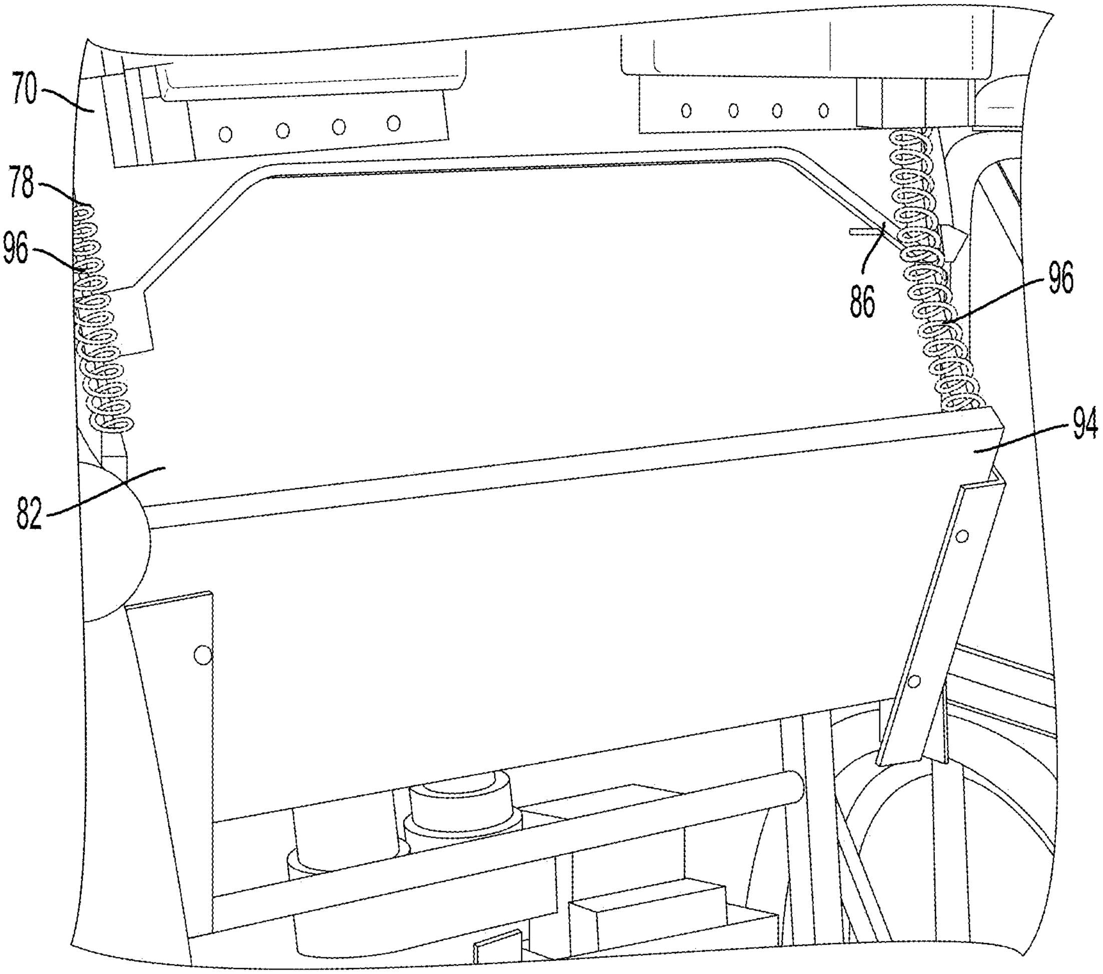
FIG. 8 shows a perspective view of a fall seat of the convertible wheelchair of FIG. 1.
Figure 9:
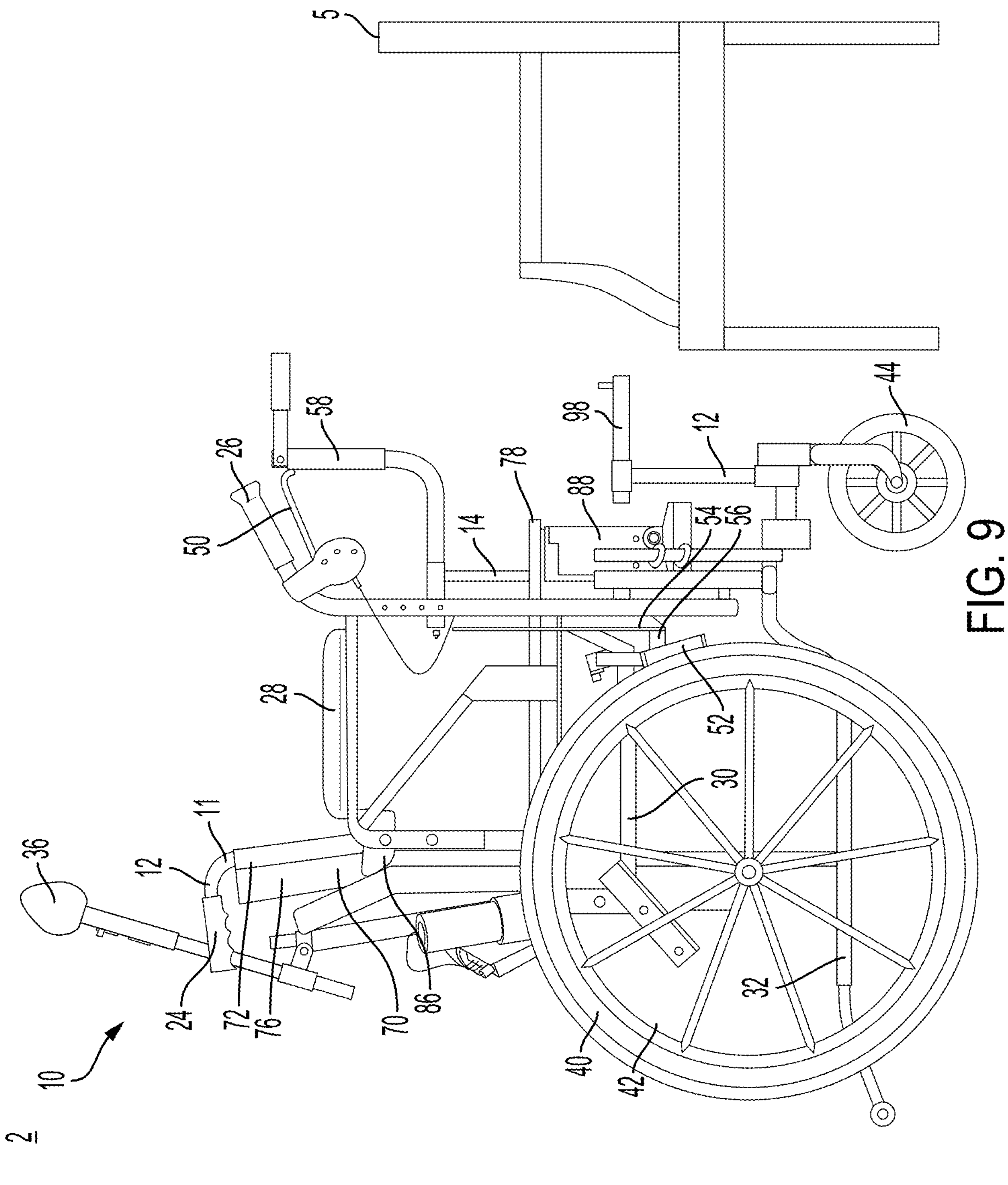
FIG. 9 shows a side view of the convertible wheelchair of FIG. 1.

Shifting convertible wheelchair 10 between wheelchair configuration 2 (FIG. 1) and walker configuration 4 can be simple such that a user can complete the conversion independently. As shown in FIG. 8, convertible wheelchair 10 can include a fastener release 86. In some embodiments, fastener release 86 can remove fastener 84 from chair seat link 34. In some embodiments, fastener release 86 can be a lever coupled to fastener 84 such that lifting fastener release 86 can remove fastener 84 from chair seat link 34. By removing fastener 84 from chair seat link 34, convertible wheelchair 10 can be returned to wheelchair configuration 2 (e.g., FIG. 3). With reference to FIG. 9 and as discussed above, in wheelchair configuration 2, a user can be seated as chair back 72 and chair seat 78 can extend generally perpendicularly relative to each other. Additionally, chair 70 can be vertically lowered to provide a comfortable and practical seated position for the user. For example, chair 70 can be lowered if a user is shorter to decrease the distance between chair 70 and the ground. Similarly, chair 70 can be vertically raised, such as if the user is taller and desires a greater distance between chair 70 and the ground.

In some embodiments, a user can independently shift convertible wheelchair 10 between wheelchair configuration 2 and walker configuration 4 without the use of their arms. In some embodiments, chair seat 78 can be rotatable relative to chair back 72 similar to how fall seat 94 is rotatable relative to chair seat 78. In some embodiments, chair seat 78 can be biased to be adjacent to chair back 72. In some embodiments, this biasing can be in lieu of the engagement between fastener 84 and chair seat link 34. As a user desires to be seated in wheelchair configuration 2, the user can push into chair seat 78 with their backside to outwardly rotate chair seat 78. The user can then sit in chair 70 to maintain chair seat 78 in a generally perpendicular position relative to chair back 72. To transition convertible wheelchair 10 to walker configuration 4, the user can move safety handles 58 positioned in front of the user when the user seated within convertible wheelchair 10. Instead of using their hands, the user can use another body part to move safety handles 58 away to exit convertible wheelchair 10. Once the user is no longer maintaining chair seat 78 in a generally perpendicular position relative to chair back 72 by being seated in chair 70, chair seat 78 can be rotated to return to a position adjacent to chair seat 78. The user can then stand and move in the space previously occupied by fall seat 94 in walker configuration 4. Accordingly, users who do not have the capability of using their hands can also utilize convertible wheelchair 10 for increased mobility.

Frame 11 can provide additional stability features to users of convertible wheelchair 10. As shown in FIG. 9 and as discussed above, in some embodiments, frame 11 can include stability bars 98 extending from front vertical members 12. Stability bars 98 can extend forwardly from convertible wheelchair 10 and can be positioned lower to the ground relative to arm rests 28 and chair 70, for example. As shown in relation to a chair 5, stability bars 98 can provide leverage for a user as they transition between chair 70 of convertible wheelchair 10 to chair 5 (which can be, for example, a car seat, a hospital wheelchair, a bed, a living room chair, etc.). Accordingly, a user can safely and securely move from a seated position in wheelchair configuration 2 to a seated position external to convertible wheelchair 10 by grasping and leveraging stability bars 98. Similarly, a user can safely and securely move from a seated position external to convertible wheelchair 10 to a seated position in wheelchair configuration 2 to by grasping stability bars 98. In some embodiments, stability bars 98 can be rotatable on front vertical members 12. In this way, a user is provided with stability features in a more forward position relative to other parts of frame 11 as they move closer to chair 5. Stability bars 98 and/or safety handles 58 also provide grasping surfaces for the user. The user can grip stability bars 98 and/or safety handles 58, as convertible wheelchair 10 is mobile to feel control and security over the device. In some embodiments, front handles 26 and/or stability bars 98 and/or safety handles 58 may be used by a user to step into and out of a vehicle, on or off a commode, on or off a separate chair or other seat, etc.—without assistance. As discussed above, the security and stability provided by these support features also give users confidence so that they may feel equipped and able to advance their standing and walking abilities. Additionally, such features provide the user with independence. Instead of requiring a caregiver at all times to monitor the user as they stand and walk, a user can freely stand and walk with support from these features. In this way, the user can gain self-reliance and competently conduct their daily lives unattended or with minimum supervision.

Figure 10:
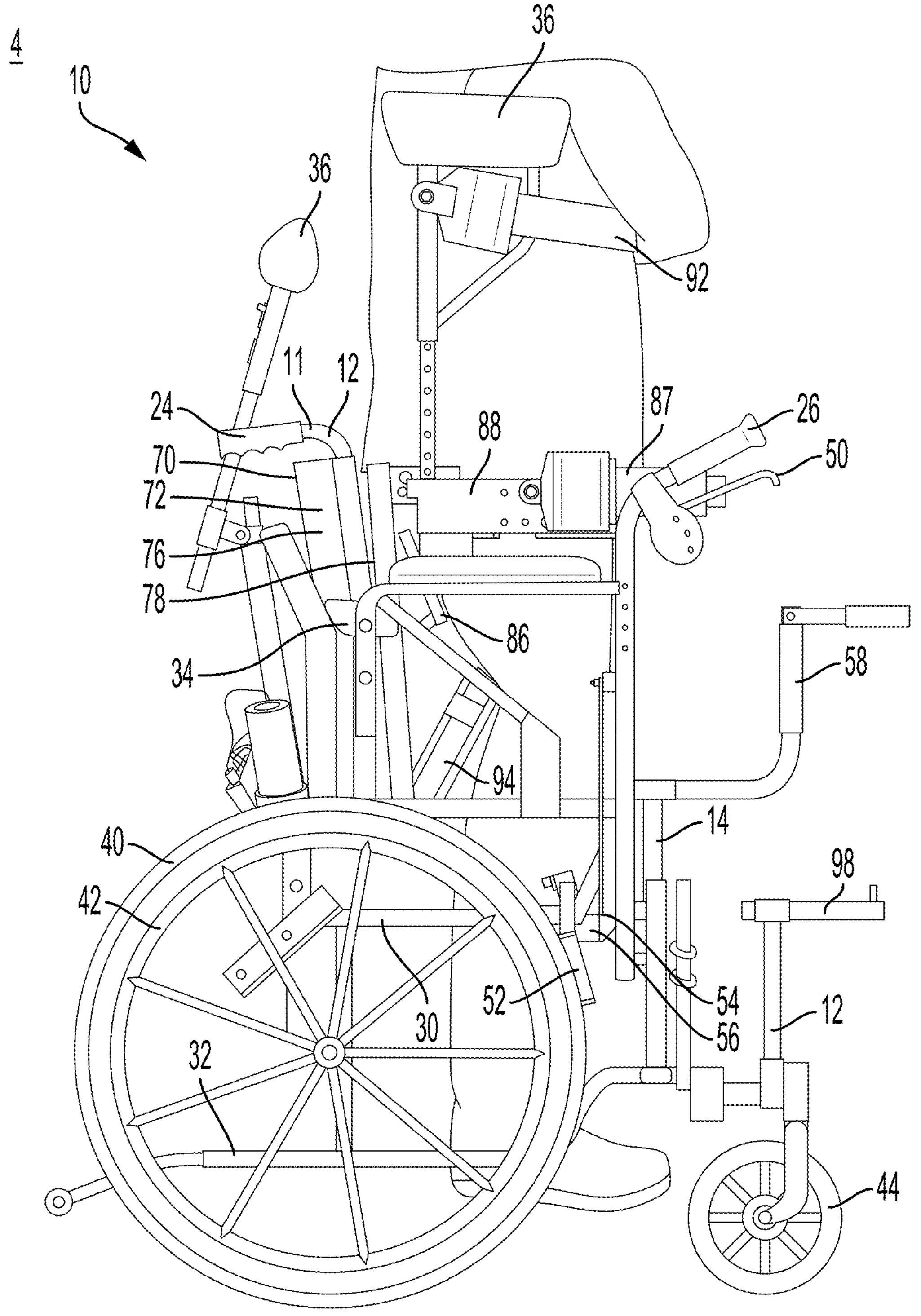
FIG. 10 shows a side view of the convertible wheelchair of FIG. 1.

As shown in FIG. 10, convertible wheelchair in walker configuration 4 can support a user as they are standing or walking. To provide additional support, in some embodiments, crutches 36 can be used. Instead of removing crutches 36 from convertible wheelchair 10, a user can maintain crutches 36 in a position adjacent to chair back 72 in walker configuration 4. As shown, a user can position crutches 36 under their arms for additional standing and walking stability. In some embodiments, a second torso support can be coupled to crutches 36. In some embodiments, crutches 36 can support upper torso support belts 92. In some embodiments, upper torso support belts 92 can be a belt similar to lower torso support belts 87. In some embodiments, upper torso support belts 92 can secure around a front of a torso. In some embodiments, upper torso support belts 92 can be hook-and-loop straps and/or can include one or more buckles, micro-adjustments, and/or hook ends. In some embodiments, upper torso support belts 92 can be adjustable to provide a user with a looser fit or to accommodate a larger waist area. In some embodiments, torso support belts 92 and/or 87 may be coupled to convertible wheelchair 10 via a track and/or rollers. In this way, if a user wishes to sit or stand while torso support belts 92 are closed, the torso support belts 92 and/or 87 may comfortably follow the user's torso as they sit or stand. In some embodiments, stability bars 98 are not included, and instead the torso support belts 92 and/or 87 are used alone. In some embodiments, torso support belts 92 and/or 87 may be coupled to convertible wheelchair 10 via a lever and/or spring. Similarly, if a user wishes to sit or stand while torso support belts 92 are closed, the torso support belts 92 and/or 87 may comfortably follow the user's torso as they sit or stand. This additionally prevents torso support belts 92/87 from binding when sitting down, and prevents the user from sliding down inside the torso support belts 92/87 when sitting. In some embodiments, stability bars 98 are not included, and instead the torso support belts 92 and/or 87 are used alone.

Upper torso support belts 92 can be positioned above the lower torso supports, e.g., lower torso support first end 88, lower torso support second end 89, cushions 90, and lower torso support belts 87 (e.g., relative to axis 8 shown in FIG. 1). Accordingly, upper torso support belts 92 can secure around an area of a torso above an abdomen region of a user, e.g., a chest region. Including upper torso support belts 92 provides additional stability and support to users to reduce the risk of them tipping or falling and potential injury. By reducing this risk, users are able to be mobile with less assistance (e.g., from caregivers or healthcare professionals). The security provided by multiple torso supports can give users the confidence to freely stand and walk. Further, the torso supports described herein (e.g., upper torso support belts 92, lower torso support first end 88, lower torso support second end 89, cushions 90, and lower torso support belts 87) can be secured entirely around a torso of a user. Accordingly, the user can be retained within the torso supports such that the user does not need to grasp a structure to limit or reduce the risk of tipping or falling. This can be advantageous for users who lack the ability to quickly and/or instinctively catch themselves. The torso supports can also be quickly engaged and disengaged. In this way, a user can quickly and easily convert convertible wheelchair 10 from wheelchair configuration 1 (FIG. 1) and walker configuration 4 to support dynamic movement. In some embodiments, conversion of convertible wheelchair 10 from wheelchair configuration 1 (FIG. 1) and walker configuration 4 can take less than approximately two minutes, such as approximately one minute, such as approximately 30 seconds.

Figure 11:
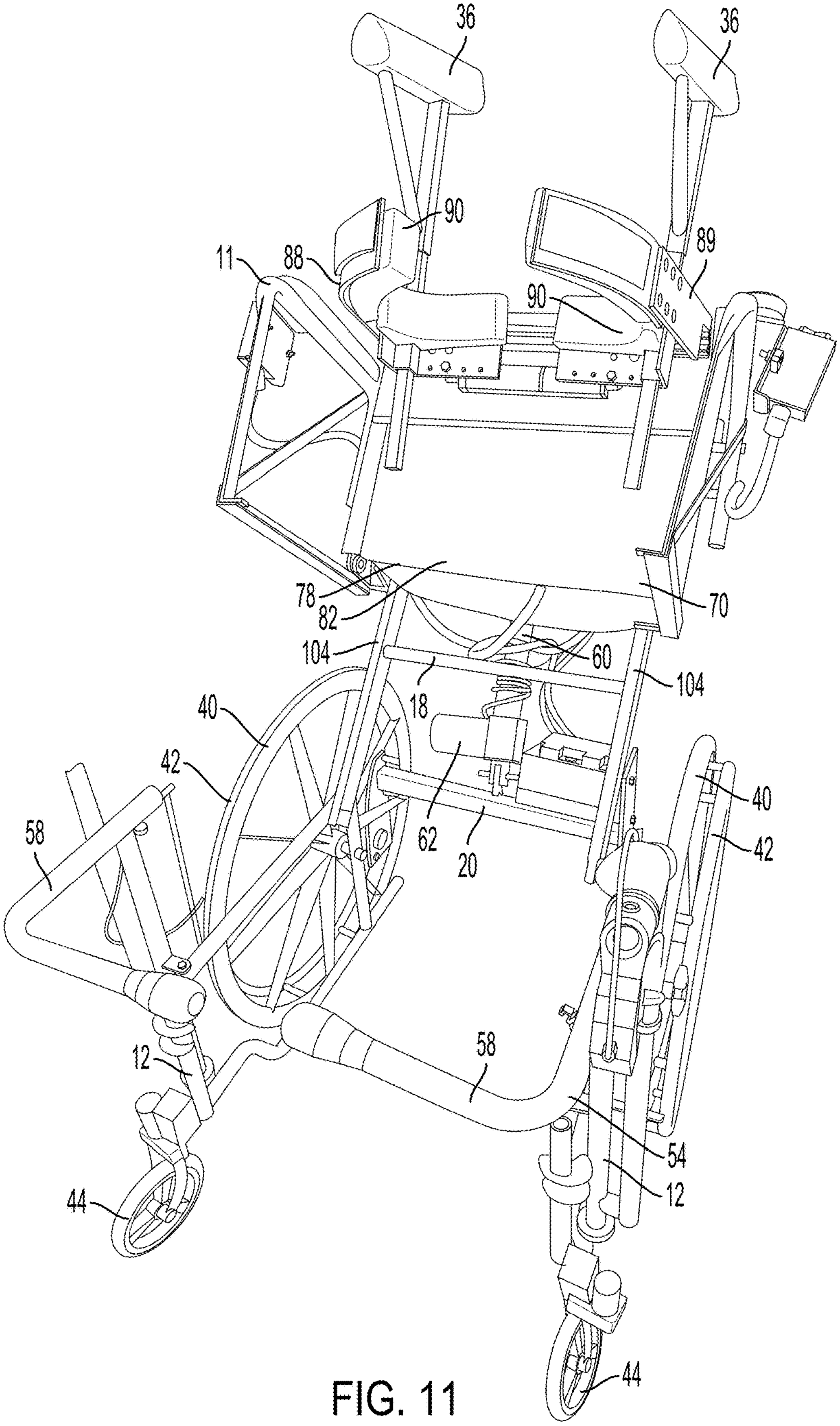
FIG. 11 shows a perspective view of a convertible wheelchair according to some embodiments.
Figure 12:
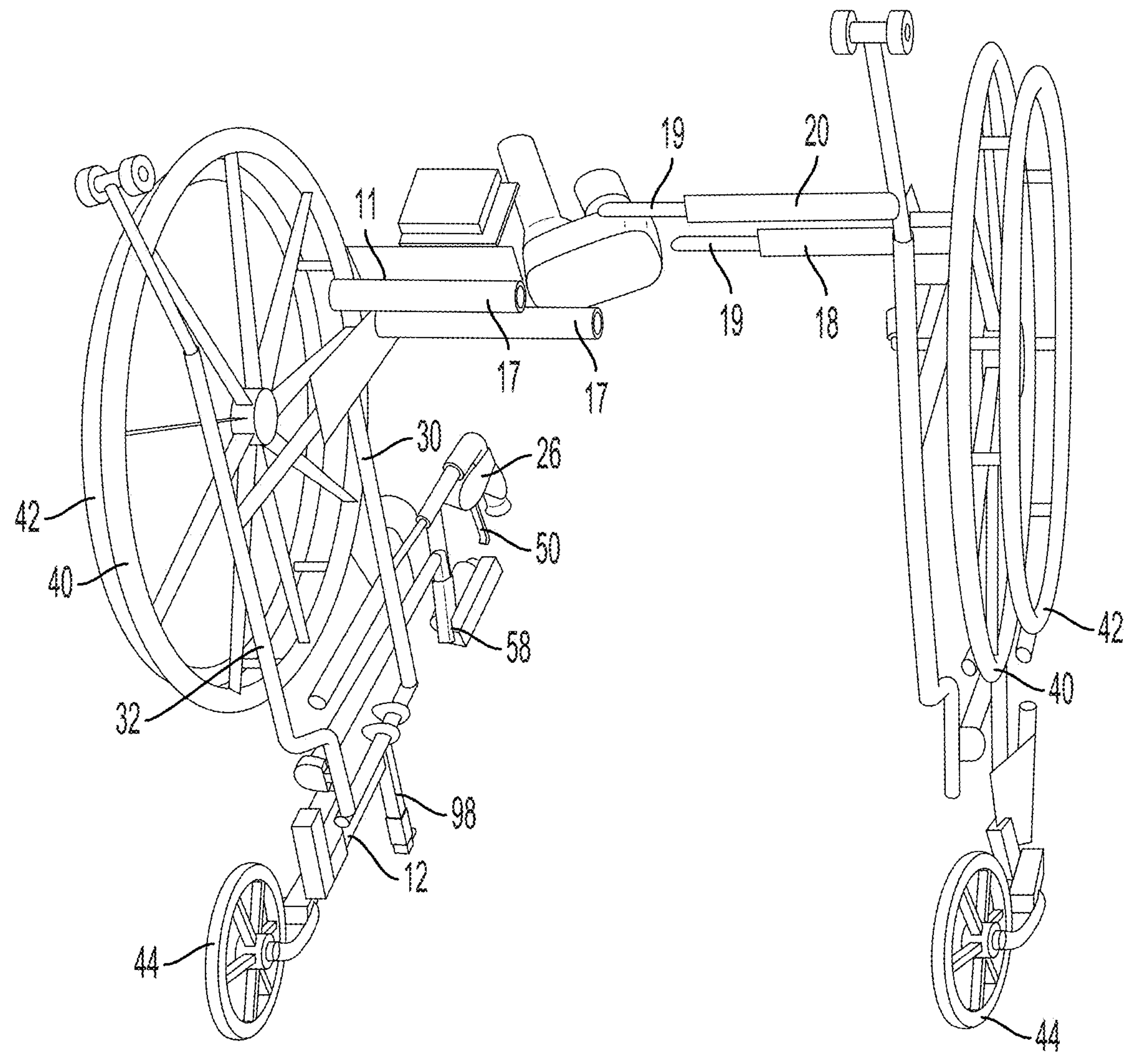
FIG. 12 shows a perspective view of the convertible wheelchair of FIG. 11.

In addition to providing an advanced assistive device, convertible wheelchair 10 can be convenient to use. With reference to FIGS. 11-12, convertible wheelchair 10 can be modular. As discussed above, convertible wheelchair 10 can be taken apart easily for compact storage. This configuration can be advantageous in applications where users require frequent transportation, such as for hospital or rehabilitation visits. As shown in FIG. 11, frame 11 can be detached to remove chair 70. Frame 11 can support vertical supports 104, which can be lifted from frame 11 to detach chair 70. As shown in FIG. 12, frame can additionally include back support frame member holes 17 and back support member rods 19. Each of intermediate back member 18 and lower back member 20 can include a back support frame member hole 17 and a back support member rod 19. Back support member rod 19 can be inserted into back support frame member hole 17 for assembly. Similarly, back support member rod 19 can be inserted into back support frame member hole 17 to disassemble frame 11. Based on the foregoing, convertible wheelchair 10 can be easily and quickly taken apart to stack and store smaller assemblies.

Figure 13:
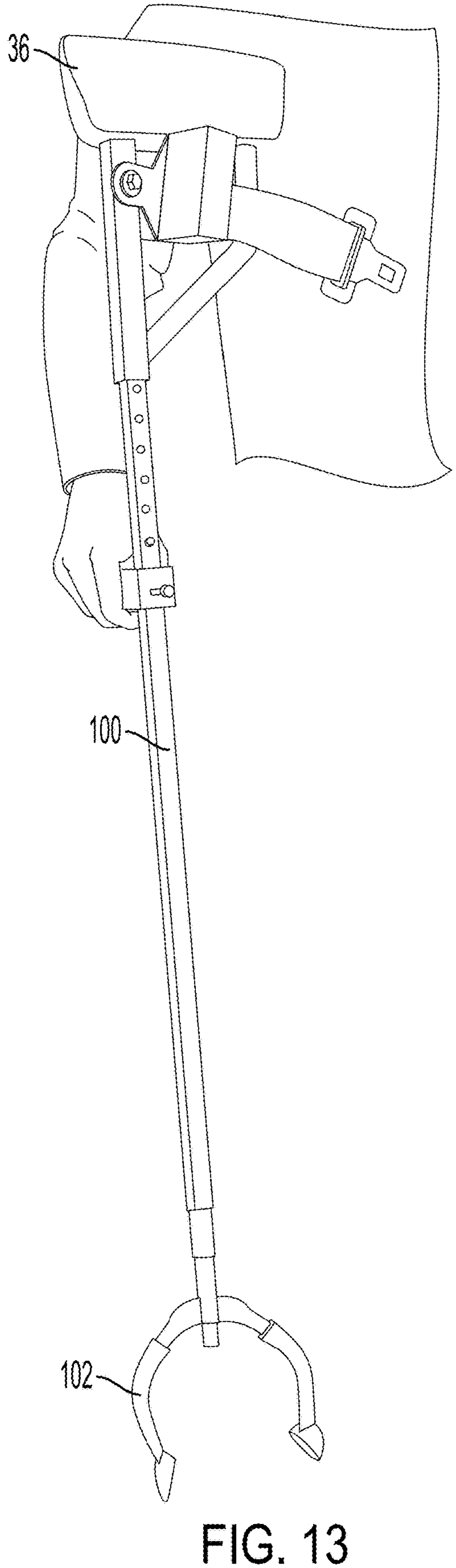
FIG. 13 shows a perspective view of a crutch of the convertible wheelchair of FIG. 1 and a walking stick according to some embodiments.

As shown in FIG. 13, in some embodiments, crutches 36 can be removed from convertible wheelchair 10 (FIG. 1). In some embodiments, convertible wheelchair 10 (FIG. 1) can also include walking sticks 100. In some embodiments, crutches 36 can be removed and inserted into walking sticks 100 to support walking without use of walking configuration 4 of convertible wheelchair 10. Accordingly, users can have additional flexibility to walk without the use of walking configuration 4 of convertible wheelchair 10. In some embodiments, walking sticks 100 can support removable grips 102. Removable grips 102 can be used to grab items that are out of reach, such as overhead items. Crutches 36 with walking sticks 100 and removable grips 102 can additionally be used in wheelchair configuration 2 (FIG. 1) and walker configuration 4 (FIG. 4) to facilitate reaching items while sitting, standing, and walking as well. In this way, users can have tools and accessories to support their dynamic mobility.

In some embodiments, convertible wheelchair 10 can be provided in a kit. The kit can include the parts of convertible wheelchair 10 for assembly. In some embodiments, a conversion kit can be available with tools and/or parts to convert an existing assistive device into convertible wheelchair 10 described herein.

Figure 14:
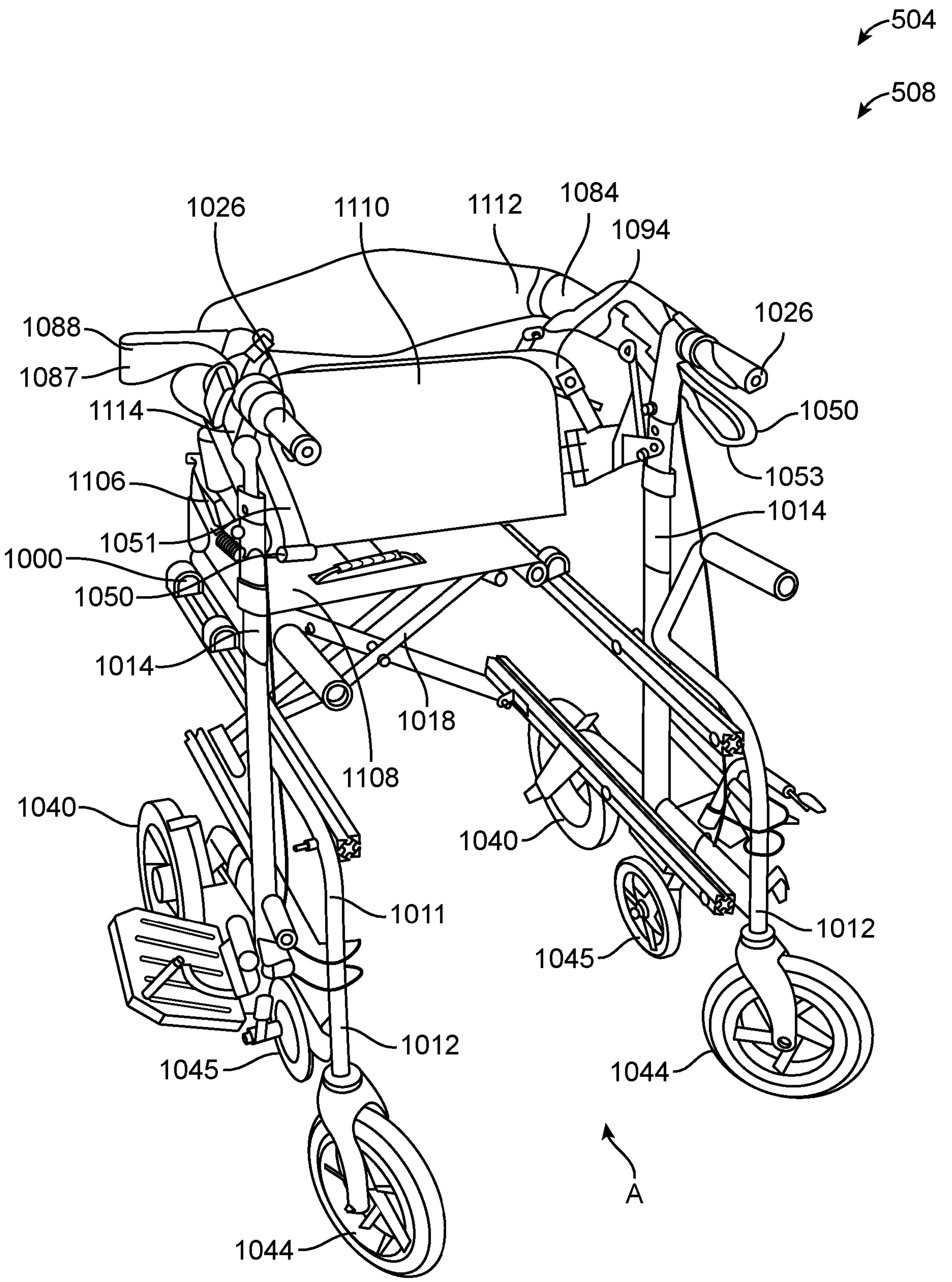
FIG. 14 shows a perspective view of a convertible walker according to some embodiments.

FIG. 14 shows a convertible walker 1000. Convertible walker 1000 can include components of convertible wheelchair 10, described with reference to FIGS. 1-13, or can be compatible with components of convertible wheelchair 10. Convertible walker 1000 (e.g., or any walker described herein) may be configured as an upright walker. As with convertible wheelchair 10, convertible walker 1000 can provide a user with mobility support and reduce the risk of injury. Convertible walker 1000 can provide the user with any of the advantages described with reference to convertible wheelchair 10. Convertible walker 1000, like convertible wheelchair 10, can include a wheelchair configuration 502 and a walker configuration 504. In this way, convertible walker 1000 can provide the user with flexibility and security as they move between standing, walking, and sitting positions.

As shown, convertible walker 1000 can include a frame 1011. In some embodiments, frame 1011 can support a rear extension 1108 that can hold personal belongings of a user of convertible walker 1000. Frame 1011 can also support a lower rest 1110 and an upper rest 1112, in some embodiments. Upper rest 1112 can be a support for the user and can be positioned proximate to a lower back of the user. Lower rest 1110 can be disposed below upper rest 1112. Upper rest 1112 in the walker configuration may be configured as a fall seat (e.g., swing seat), such as fall seat 1094. In some embodiments, the fall/swing seat may be removed, and the seat may be provided on the rear extension 1108, such that the user may sit on the seat facing forward. In some embodiments, the seat may be provided on the rear extension 1108, such that the user may sit on the seat facing forward. In such configurations, the user may sit on the seat e.g., without turning around to sit down. In such configurations, the seat belt may be removed. In some embodiments, the brake may engage and automatically be actuated as a user begins to stand up, thereby fixing the walker in place to increase stability and not let the walker/wheelchair slip away as the user stands up. In some embodiments, the brake may engage and manually be actuated as a user begins to stand up, thereby fixing the walker in place to increase stability and not let the walker/wheelchair slip away as the user stands up.

In some embodiments, convertible walker 1000 can include a torso support 1087. As in convertible wheelchair 10 (FIGS. 1-13), convertible walker 1000 can include torso support 1087 to secure around a torso of a user, such as at an abdomen region of the user. In some embodiments, torso support 1087 can include a first end 1088 and a second end 1089 opposing first end 1088. First end 1088 and second end 1098 can extend to the front of the torso and secure to each other to retain the user in convertible walker 1000. In some embodiments, each of first end 1088 and second end 1089 can include a belt. In some embodiments, first end 1088 and second end 1089 can be hook-and-loop straps and/or can include one or more buckles, micro-adjustments, and/or hook ends. Torso support 1087 can be adjustable to fit around the user. In this way, torso support 1087 can be adjusted inward to better secure the user in convertible walker 1000.

Figure 15:
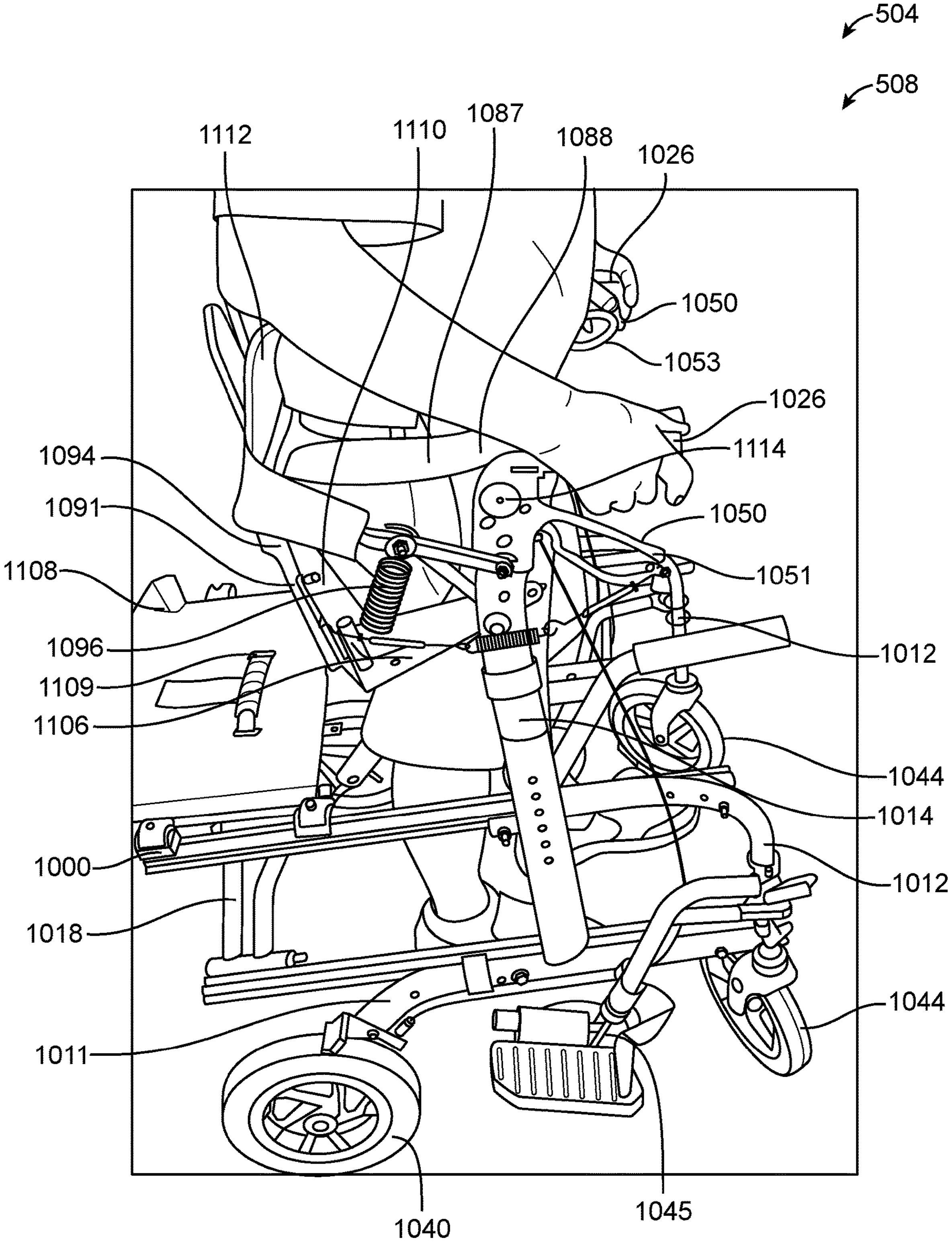
FIG. 15 shows a perspective view of the convertible walker of FIG. 14.

Frame 1011 can include one or more attachments 1114 to secure torso support 1087 when not in use, in some embodiments. As shown in FIGS. 14-15, frame 1011 can include an attachment 1114 disposed adjacent to a front handle 1026 of convertible walker 1000. In some embodiments, attachment 1114 can be a magnet. Accordingly, torso support 1087 can magnetically secure to attachment 1114. In other embodiments, attachment 1114 can include a hook-and-loop fastener or a slot to receive first end 1088 or second end 1098 of torso support 1087.

Torso support 1087 can support a user in walker configuration 504. In this way, as the user positions themselves in walker configuration 504, the user can feel secure, and any potential injury from tipping or falling is minimized or prevented. In some embodiments, torso support 1087 can be attached to frame 1011 of convertible walker 1000. In some embodiments, torso support 1087 can extend from lower rest 1110. When in use, torso support 1087 can extend outwardly from lower rest 1110 to a position adjacent to front handles 1026. Accordingly, the user in convertible walker 1000 can fill the majority of space between front vertical members 1012 and a rear frame member 1018. As shown in FIG. 1, a space A of convertible walker 1000 can be free of obstructions to allow the user to fill space A with walking movements. In some embodiments, torso support 1087 can allow for hands-free driving of convertible walker 1000. As the user walks, the user can propel convertible walker 1000 forward by having torso support 1087 attached to frame 1011 or the seat secured around the user's torso. Indeed, the seatbelt around the user's torso/waist is the driving force that moves the walker as the user moves around. In this way, the walker configuration 504 reduces the amount of work the hands of the user perform because the user does not need to push the walker. If the hands are used, the user would be using to pull, rather than push, the walker. This allows for greater freedom of movement, including hands-free movement. By allowing hands-free movement, the user can practice walking while remaining secured within convertible walker 1000, and/or attend to other matters that require use of their hands. This provides greater freedom and independence for the user, while retaining safety benefits of the walker, such as a fall seat or swing seat as described herein.

Figure 16:
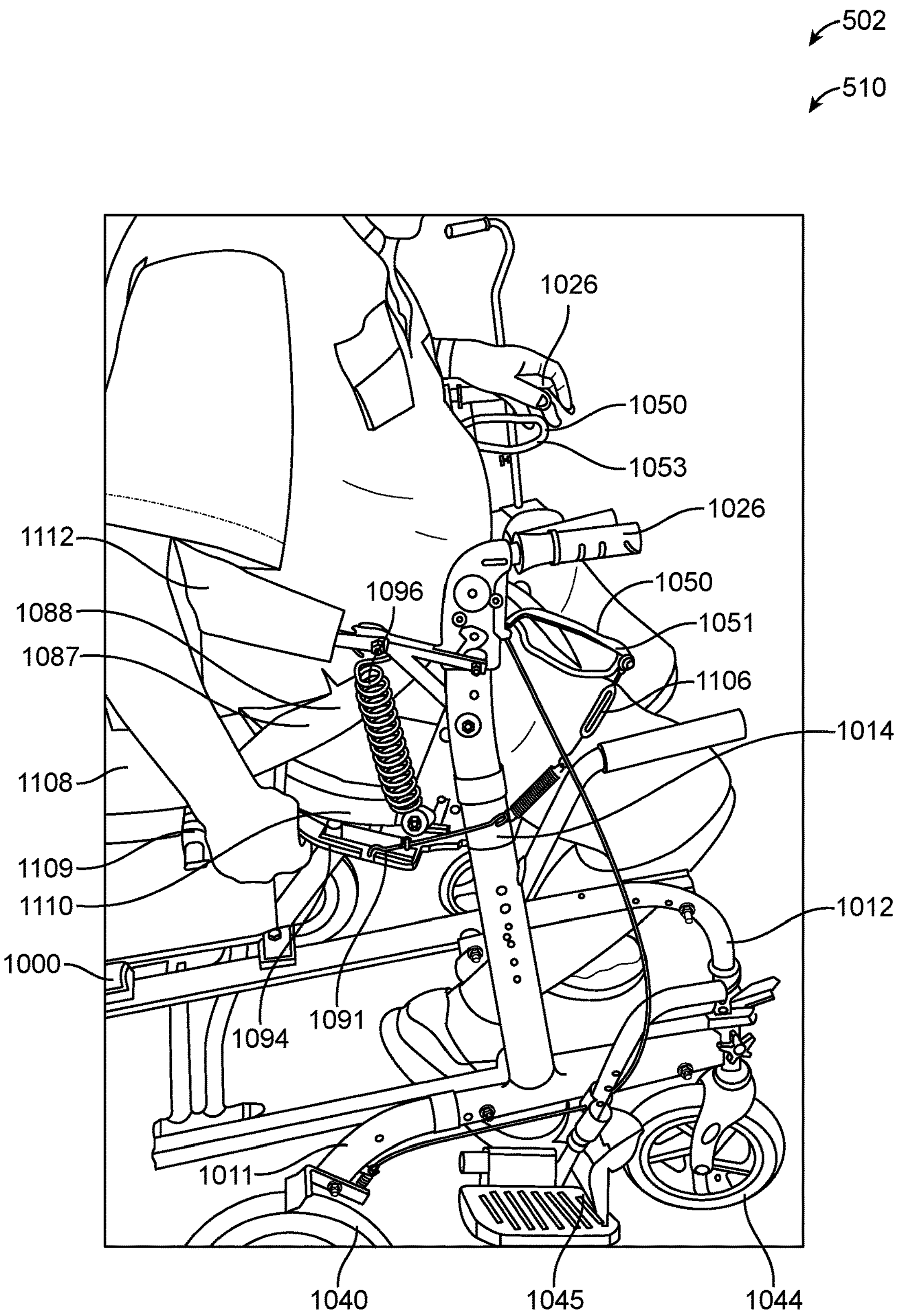
FIG. 16 shows a perspective view of the convertible walker of FIG. 14.

With reference to FIGS. 15-16, in some embodiments, convertible walker 1000 can include a fall seat 1094. As with fall seat 94 (FIG. 4), fall seat 1094 can be a movable seat. As shown, fall seat 1094 can be rotatable relative to frame 1011. In some embodiments, fall seat 1094 can be rotatable relative to upper rest 1112.

In some embodiments, fall seat 1096 can have a first position 508, shown in FIG. 15. Fall seat 1094 can be rotated from first position 508 to a second position 510, shown in FIG. 16. Fall seat 1094 can be rotated by the falling action of a user to catch the user. If a user falls while standing or walking, fall seat 1094 can rotate to second position 510 by the user's falling action. Fall seat 1094 rotating to second position 510 can provide a seat for the user to break their fall. The user can also deliberately rotate fall seat 1094 to second position 510 if they decide to rest, for example. The user can push into fall seat 1094 with their backside to rotate fall seat 1094 to second position 510.

In some embodiments, fall seat 1094 can be biased to be in the first position 508. Accordingly, when a user desires and is able to return to a standing position, fall seat 1094 can rotate to return to first position 508. The bias can also help to lift the user to the standing position, supporting them as they move from a sitting position to the standing position.

In some embodiments, fall seat 1094 is automatically rotated to return to its biased position via one or more springs 1096. A spring 1096 can be coupled to upper rest 1112 and fall seat 1094 in some embodiments to bias fall seat 1094 to be in first position 508 shown in FIG. 15. Fall seat 1094 can include a first side 1091 and a second side 1093.

In some embodiments, a spring 1096 can be coupled to first side 1091 and upper rest 1112. In some embodiments, a spring 1096 can be coupled to second side 1093 and upper rest 1112. In this way, fall seat 1094 can be rotatable relative to upper rest 1112. FIG. 16 shows fall seat 1094 in second position 510 with fall seat 1094 being away from its biased position via extension of spring 1096. In some embodiments, the spring(s) may be coupled to one or more of the frame or seat. In some embodiments, one or more springs may provide different spring forces, such that a first spring provides a lower spring force than a second spring 1099. In this way, towards the end of the travel of the fall/sing seat, the second spring 1099 may provide lift assistance, for example, when a user is standing up from a sitting position. Moreover, a lower spring force may provide a softer fall relative to a stiffer spring, such that the first spring is used primarily to slow the user when sitting or falling, for example. In some embodiments, the second spring force provided is from about 30 pounds to about 150 pounds. In some embodiments, the second spring force provided is from about 50 pounds to about 100 pounds. In some embodiments, the second spring force provided is from about 60 pounds to about 80 pounds. In some embodiments, the spring force varies depending upon the size of the spring and/or the place of attachment of the ends of the spring. In some embodiments, a spring stop is provided that is adjustable from about 85 degrees to about 95 degrees to further tailor the spring function.

Convertible walker 1000 in walker configuration 504 can coincide with fall seat 1094 being in first position 508, shown in FIG. 15, as first position 508 allows for standing and walking. Convertible walker 1000 in wheelchair configuration 502 can coincide with fall seat 1094 being in second position 510, shown in FIG. 16, as second position 510 allow the user to be in a seated position. Convertible walker 1000 in wheelchair configuration 502 can be pushed to propel the convertible walker forward as a wheelchair, e.g., with handles (not shown) on the rear of convertible walker 1000. As shown in FIG. 16, torso support 1087 can support the user in wheelchair configuration 502 as well as in walker configuration 504 (FIG. 15).

In some embodiments, fall seat 1094 can be coupled to lower rest 1110. Accordingly, a user can be seated on lower rest 1110 when fall seat 1094 is rotated to second position 510. In some embodiments, lower rest 1110 can include a cushion to provide comfort to the user in both walker configuration 504 (FIG. 15) and wheelchair configuration 502 (FIG. 16).

As with convertible wheelchair 10, (FIGS. 1-13), convertible walker 1000 can include a braking mechanism. While in walker configuration 504 (FIG. 15) or wheelchair configuration 502 (FIG. 16), a user can actuate a braking mechanism to stabilize convertible walker 1000. In some embodiments, a braking mechanism can be actuated by depressing a brake handle 1050. In some embodiments, convertible walker 1000 can include a first brake handle 1051 and a second brake handle 1053. First brake handle 1051 and second brake handle 1053 can extend from front handles 1026. Similar to convertible wheelchair 10, the user of convertible walker 1000 can quickly actuate first brake handle 1051 or second brake handle 1053 to stop movement of convertible walker 1000 and reduce the risk of injury. In some embodiments, the braking mechanism maybe locked if a user falls into the fall seat/swing seat. In some embodiments, the user may unlock the braking mechanism while in the sitting configuration. In some embodiments, the user can release the brake from an actuated position when seated, thereby allowing the walker to be used as a wheelchair. In some embodiments, the brake may engage and automatically be actuated as a user begins to stand up, thereby fixing the walker in place to increase stability and not let the walker/wheelchair slip away as the user stands up. In some embodiments, the brake may engage and manually be actuated as a user begins to stand up, thereby fixing the walker in place to increase stability and not let the walker/wheelchair slip away as the user stands up.

With reference to FIG. 16, in some embodiments, fall seat 1094 is coupled to first brake handle 1051 or second brake handle 1053. As shown, fall seat 1094 can be coupled to first brake handle 1051. In some embodiments, a brake actuator 1106 can couple fall seat 1094 to first brake handle 1051. In some embodiments, brake actuator 1106 includes one or more of a chain, a cable, a string, a rope, a rod, a linkage, a joint, a motor, a cam, spring, lever, etc. Accordingly, as fall seat 1094 is rotated from first position 508 (FIG. 15) to second position 510 by the falling action of a user to catch the user, fall seat 1094 can actuate first brake handle 1051. In this way, convertible walker 1000 can be immobilized as the user falls onto fall seat 1094, reducing the risk of injury that may result if convertible walker 1000 remains mobile during the falling action of the user. In some embodiments, first brake handle 1051 can remain actuated to immobilize convertible walker 1000 as fall seat 1094 is rotated from second position 510 to first position 508. Accordingly, convertible walker 1000 can be immobilized as the user returns to a standing position such that convertible walker is secured between wheelchair configuration 502 and walker configuration 504 (FIG. 15).

Figure 17:
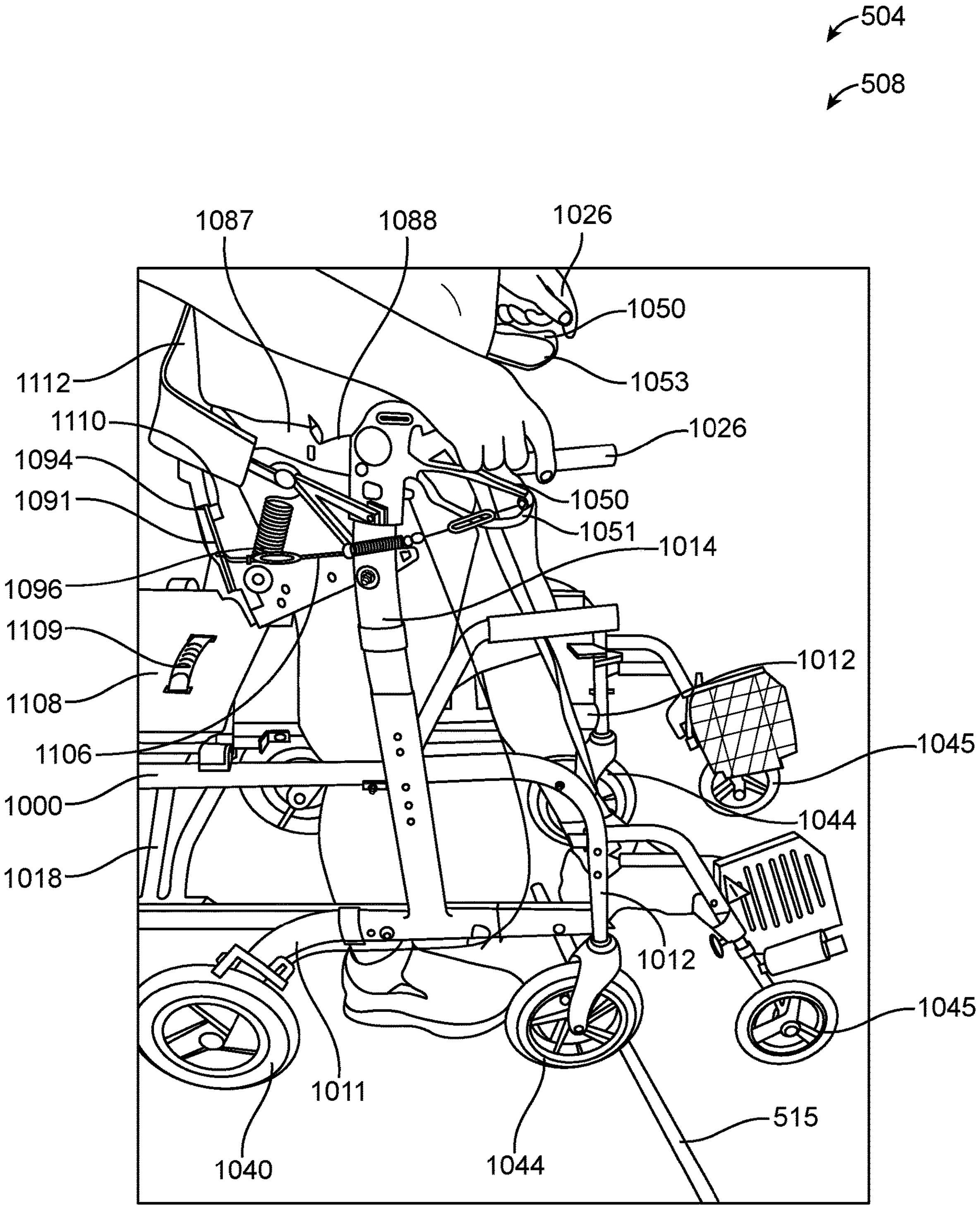
FIG. 17 shows a perspective view of the convertible walker of FIG. 14.

In addition to providing stability for a user when converting between wheelchair configuration 502 (FIG. 16) and walker configuration 504 (FIG. 15), convertible walker 1000 can secure the user when traversing obstacles such as curbs and debris. An obstacle 515 that the user may encounter when walking with convertible walker 1000 is shown in FIG. 17. In some embodiments, convertible walker 1000 can include one or more rear wheels 1040 and one or more front wheels 1044, which can be utilized in both wheelchair configuration 502 and walker configuration 504. As shown, in some embodiments, convertible walker 1000 can include one or more anti-tip wheels 1045. In some embodiments, anti-tip wheel 1045 can be disposed between rear wheel 1040 and front wheel 1044. In some embodiments, anti-tip wheel 1045 can be pivotable relative to frame 1011. To secure convertible walker 1000 when traversing obstacle 515, anti-tip wheel 1045 can be engaged. Accordingly, anti-tip wheel 1045 can be pivoted. As shown, anti-tip wheel 1045 can be pivoted such that anti-tip wheel 1045 is ahead of front wheel 1044. In some embodiments, the anti-tip wheel 1045 is positioned generally off the ground relative to the other wheels in a range of about 0.5 inches to about 2.0 inches. In this way, the anti-tip wheels may engage the ground, for example when the front wheels of the walker hit an object—the walker may safely tilt forward until the anti-tip wheels engage and prevent the walker from tilting further, and allow the user to navigate over the object. As the user approaches obstacle 515, anti-tip wheel 1045 can pass over obstacle 515. Convertible walker 1000 can be prevented from tippling, as the weight of convertible walker is concentrated rear of anti-tip wheel 1045. Front wheel 1044 can then follow anti-tip wheel 1045 and pass over obstacle 515. Because anti-tip wheel 1045 wheel is ahead of front wheel 1044, convertible walker 1000 can again be prevented from tipping.

Figure 18:
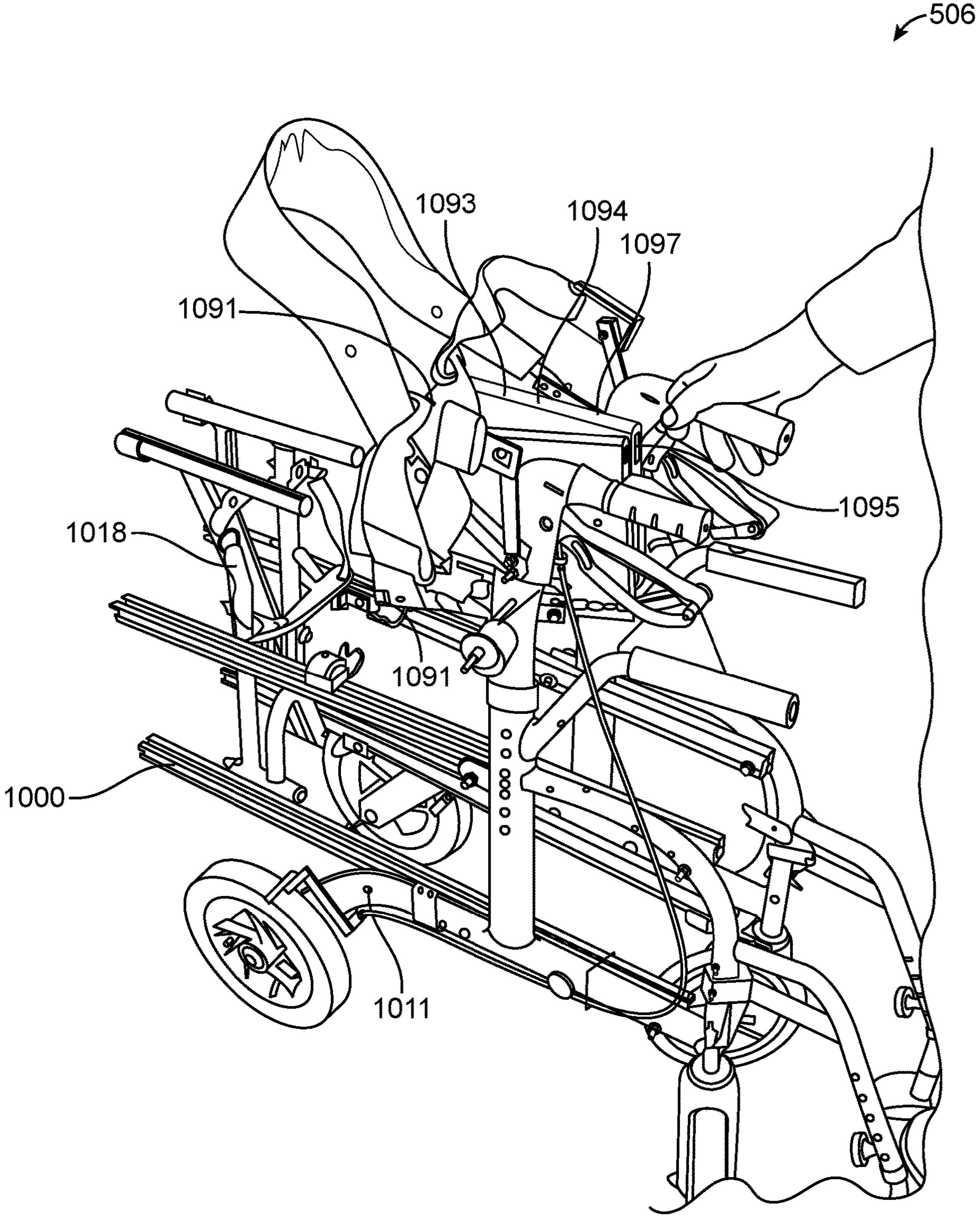
FIG. 18 shows a perspective view of the convertible walker of FIG. 14.

Convertible walker 1000 can be collapsible to facilitate storage and transportation. Convertible walker 1000 in a folded configuration 506 is shown in FIG. 18. As shown, in some embodiments, rear frame member 1018 can be foldable to facilitate converting convertible walker 1000 to folded configuration 506. In some embodiments, a handle 1109 (FIG. 15) of rear extension 1108 (FIG. 1109) can pull rear frame member 1018 such that it collapses inward to fold convertible walker 1000. In some embodiments, fall seat 1094 can be foldable as well to facilitate converting convertible walker 1000 to folded configuration 506. In some embodiments, fall seat 1094 can include an intermediate portion 1097 disposed between first side 1091 and second side 1093. Intermediate portion 1097 can include a joint 1095. In some embodiments, fall seat 1094 can be folded at joint 1095. In some embodiments, the seat and/or seatbelt may be omitted, such that the walker is configured to function as discussed without such a seat. Indeed, even such a configuration without a seat has advantages over other walkers—a user may stand straight up rather than hunch forward to push the walker. In use, a user's hips can contact the inner side of the walker and guide the directionality of the walker when moving forward/backward, turning, or shuffling laterally, for example. As explained above, in some embodiments, the seatbelt around the user's torso/waist is the driving force that moves the walker as the user moves around. In this way, the walker configuration 504 reduces the amount of work the hands of the user perform because the user does not need to pull the walker, since the seatbelt couples the walker to the user, and the user does not need to push the walker in the way that is needed for walkers that are pushed in front of a user requires. In some embodiments, without a torso support/seatbelt, the configuration allows for additional stability walking down steps, such that the person does not need to push the walker in front of them and instead is pulling the walker behind them. In this way, a user can step down (or up) without a walker in their way since the walker is oriented behind them, thus given greater freedom and stability on short stairs/steps. If the hands are used, the user would be using the hands to pull, rather than push, the walker. This allows for greater freedom of movement, including hands-free movement. By allowing hands-free movement, the user can practice walking while remaining secured within convertible walker 1000, and/or attend to other matters that require use of their hands. This provides greater freedom and independence for the user, while retaining safety benefits of the walker, such as a fall seat or swing seat as described herein. Further, the configuration of the walker allows for hip contact such that it provides additional stability and prevent users from falling, in that the user is surrounded on three sides—the rear, the left, and the right. Additionally, this configuration allows for a user to sit without turning around, thereby removing an additional risk for instability or falling. In some embodiments, the torso support may include a seatbelt. In some embodiments, the torso support may not include the seatbelt (e.g., using the members as hip huggers).

Figure 19:
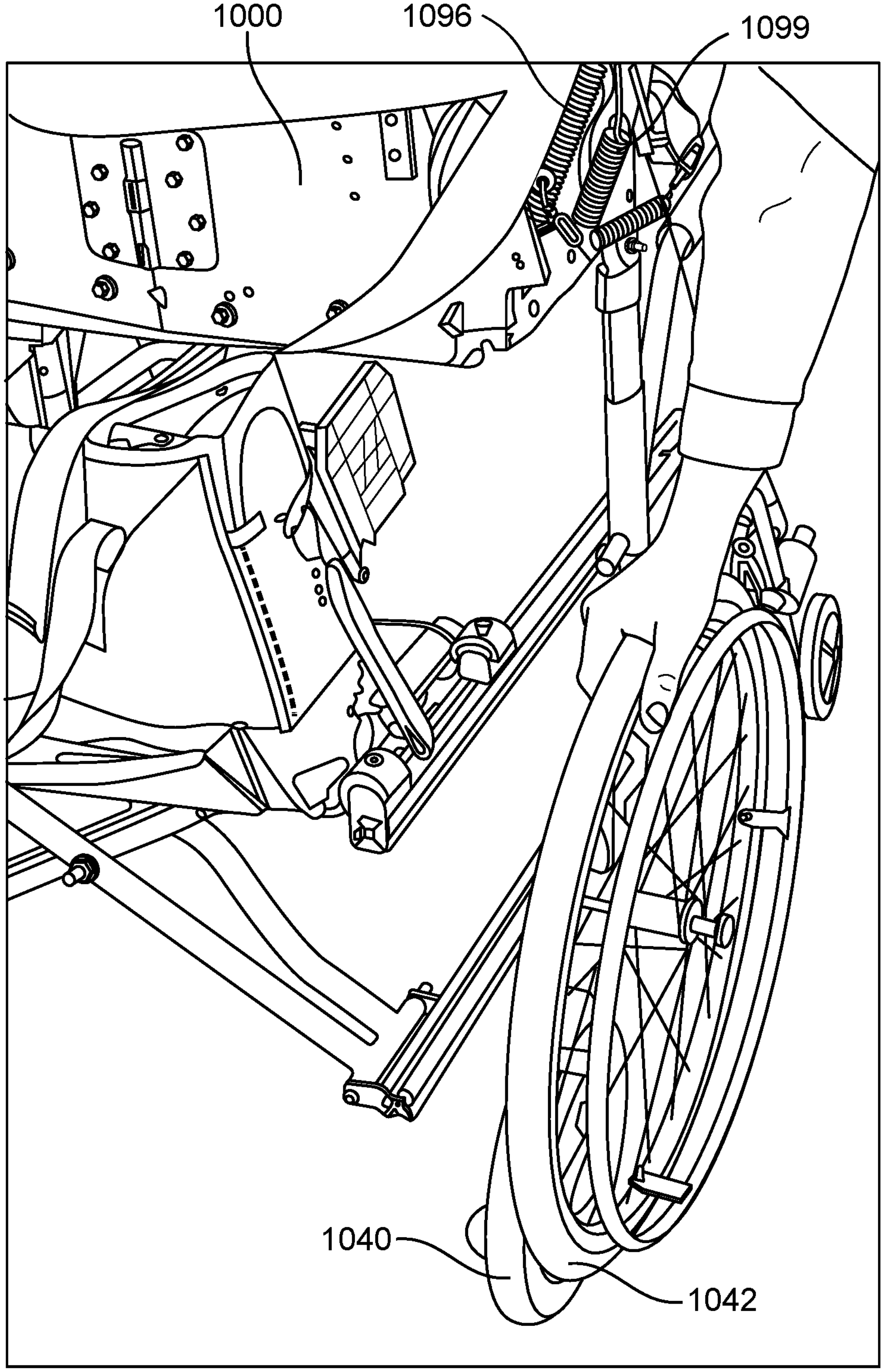
FIG. 19 shows a perspective view of the convertible walker of FIG. 14.

As discussed above, convertible walker 1000 can include components of convertible wheelchair 10 (FIGS. 1-13) or can be compatible with components of convertible wheelchair 10. As shown in FIG. 19, convertible walker 1000 can receive an outer rear wheel 1042 (e.g., a wheelchair wheel) similar to outer wheel 42 (FIG. 1). In this way, convertible walker 1000 can be provided with additional stability and balance in wheelchair configuration 502 (FIG. 16). With additional stability and balance, convertible walker 1000 can lower the risk of tipping or falling. When the wheelchair wheel is attached, and the convertible walker is in a wheelchair configuration, the wheelchair wheels may be used by the user to propel the walker (in the wheelchair configuration), resulting in added mobility as compared to requiring a user to maneuver the walker with their feet. In some embodiments, the wheelchair wheel may be removed, for example, when the user is in their residence to make it more convenient to walk around and navigate a close space. In some embodiments, the wheelchair wheel is adjustable. In some embodiments, the inner rear wheel may be inside the frame of the walker. In some embodiments, the inner rear wheel may be outside the frame of the walker. In some embodiments, the center of the inner rear wheel is toward the rear of the walker relative to the wheelchair wheel. Thus, when the wheelchair wheel is added to the walker, the inner rear wheel itself raises off the ground and may function as an anti-tip wheel, in much the same way as the anti-tip wheel described above, though guarding against tipping backwards.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A walker having a walker configuration, comprising:

a frame configured to surround a user on the rear, left, and right sides;

an upper rest supported by the frame;

a lower rest supported by the frame and disposed below the upper rest, wherein the lower rest is configured to rotate relative to the frame and the upper rest; and a torso support attached to and extending from the lower rest, the torso support configured to secure around a front of a torso in a wheelchair configuration and the walker configuration, wherein the torso support comprises a first end and a second end opposing the first end, the first end and the second end configured to extend to a front of a torso.

2. The walker of claim 1, wherein the frame comprises an attachment to secure the torso support when not in use.

3. The walker of claim 2, wherein the frame comprises a front handle, and wherein the attachment is disposed adjacent to the front handle.

4. The walker of claim 1, further comprising a front handle, wherein the torso support is configured to extend outwardly from the lower rest to a position around a waist of the user.

5. A walker having a walker configuration, comprising:
a frame configured to surround a user on the rear, left, and right sides;
an upper rest supported by the frame;
a lower rest supported by the frame and disposed below the upper rest, wherein the lower rest is configured to rotate relative to the frame and the upper rest; and
a fall seat configured to rotate by the falling action of a user to catch the user.

6. A walker, comprising:
a frame;
an upper rest supported by the frame;
a lower rest supported by the frame and disposed below the upper rest; and
a fall seat having a first position and a second position, the fall seat configured to rotate from the first position to the second position by the falling action of a user to catch the user,
wherein the fall seat is coupled to the lower rest such that the user is seated on the lower rest when the fall seat is rotated to the second position,
wherein the lower rest is disposed above the fall seat in the second position.

7. The walker of claim 6, wherein the fall seat is configured to be foldable.

8. The walker of claim 6, wherein the lower rest comprises the fall seat.

9. The walker of claim 6, further comprising:
a first spring configured to bias the fall seat to be in the first position; and
a second spring configured to provide assistance force upward when a user is standing from a seated position.

10. The walker of claim 6, wherein the fall seat is biased to be in the first position.

11. The walker of claim 10, further comprising a spring coupled to the upper rest and the fall seat, the spring configured to bias the fall seat to be in the first position.

12. The walker of claim 6, wherein the fall seat is configured to be rotatable relative to the upper rest.

13. The walker of claim 6, wherein the fall seat is configured to raise and lower via user adjustment.

14. A walker, comprising:
a frame;
a front handle supported by the frame;
a brake handle supported by the frame and disposed under the front handle; and
a fall seat configured to rotate from a first position to a second position by the falling action of a user to catch the user,
wherein the fall seat is coupled to the brake handle.

15. The walker of claim 14, further comprising:
a brake actuator configured to couple the fall seat to the brake handle.

16. The walker of claim 14, wherein the fall seat is configured to actuate the brake handle when the fall seat is rotated from the first position to the second position.

17. The walker of claim 14, wherein the brake handle is configured to allow a user to release the brake when the walker is in a wheelchair configuration and the user is seated.

18. The walker of claim 14, wherein the brake handle is configured to automatically actuate when the fall seat is rotated from the second position to the first position.

19. The walker of claim 14, wherein the fall seat comprises a first side and a second side opposing the first side,
wherein the first side of the fall seat is coupled to the brake handle.

20. The walker of claim 14, further comprising a rear wheel, a front wheel, and an anti-tip wheel disposed in front of the rear wheel and the front wheel.

21. The walker of claim 20, wherein the front wheel is configured to pivot relative to the frame.

22. The walker of claim 14, further comprising a rear wheel, a front wheel, and an anti-tip wheel, the front wheel being disposed between the rear wheel and the anti-tip wheel.

* * * * *